US011886917B2

(12) United States Patent
Nabi et al.

(10) Patent No.: US 11,886,917 B2
(45) Date of Patent: Jan. 30, 2024

(54) AUTOMATION OF MANAGEMENT OF CLOUD UPGRADES

(71) Applicants: Mina Nabi, Ottawa (CA); Maria Toeroe, Montreal (CA); Ferhat Khendek, Montreal (CA)

(72) Inventors: Mina Nabi, Ottawa (CA); Maria Toeroe, Montreal (CA); Ferhat Khendek, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 556 days.

(21) Appl. No.: 17/265,998

(22) PCT Filed: Jul. 24, 2019

(86) PCT No.: PCT/IB2019/056340
§ 371 (c)(1),
(2) Date: Feb. 4, 2021

(87) PCT Pub. No.: WO2020/031011
PCT Pub. Date: Feb. 13, 2020

(65) Prior Publication Data
US 2021/0165694 A1 Jun. 3, 2021

Related U.S. Application Data

(60) Provisional application No. 62/864,096, filed on Jun. 20, 2019, provisional application No. 62/714,917, filed on Aug. 6, 2018.

(51) Int. Cl.
G06F 9/50 (2006.01)
(52) U.S. Cl.
CPC .................. G06F 9/5027 (2013.01)

(58) Field of Classification Search
None
See application file for complete search history.

(56) References Cited

U.S. PATENT DOCUMENTS 8,489,753 B2 * 7/2013 Singh .................. G06F 9/45558
709/225
8,910,156 B1 * 12/2014 Kenchammana-Hosekote ............
G06F 9/45558
718/1

(Continued)

FOREIGN PATENT DOCUMENTS

CN 104572179 B 2/2018
WO 2017130030 A1 8/2017

OTHER PUBLICATIONS

Sun et al.; "R2C: Robust Rolling-Upgrade in Clouds" 1545-5971, 2016 IEEE; (Sun_2016.pdf; pp. 811-823) (Year: 2016).*

(Continued)

Primary Examiner — Hiren P Patel
(74) Attorney, Agent, or Firm — Ericsson Canada Inc.; Julie Dufort

(57) ABSTRACT

Resources in an Infrastructure-as-a-Service (IaaS) system are upgraded in an iterative process. In response to an upgrade request indicating requested changes to a current configuration of the system, one or more graph representations of the current configuration and the requested changes are created. The graph representations include a control graph which has vertices representing resource groups, and edges representing dependences among the resource groups. A batch of resource groups is identified to be upgraded in a current iteration based on the dependencies and Service Level Agreement (SLA) requirements including availability and elasticity of the system. Upgrade operations are executed on the identified batch using selected upgrade methods which handle potential incompatibilties during (Continued)

transition of system configurations. The graph representations are updated to include any new requested changes and recovery operations in response to feedback of failed upgrade operations. The iterative process proceed to upgrade remaining one or more resource groups.

20 Claims, 16 Drawing Sheets

(56) References Cited

U.S. PATENT DOCUMENTS

| | | | |
|---|---|---|---|
| 8,966,474 B2* | 2/2015 | Herington | G06F 9/45558 718/1 |
| 9,141,381 B2* | 9/2015 | Siddegowda | G06F 8/71 |
| 9,244,674 B2* | 1/2016 | Waterman | G06F 8/658 |
| 9,304,793 B2* | 4/2016 | Kannan | G06F 9/5077 |
| 9,336,039 B2* | 5/2016 | Pershin | G06F 9/45558 |
| 9,361,092 B1 | 6/2016 | Bai et al. | |
| 9,459,856 B2 | 10/2016 | Curzi et al. | |
| 9,680,965 B2* | 6/2017 | Sharma | G06F 9/45558 |
| 10,055,216 B2* | 8/2018 | Zongker | G06F 8/63 |
| 10,083,059 B1* | 9/2018 | Singh | G06F 9/44505 |
| 10,268,470 B2 | 4/2019 | Savagaonkar et al. | |
| 10,289,400 B2* | 5/2019 | De Zaeytijd | G06F 8/65 |
| 10,754,694 B2* | 8/2020 | Nabi | G06F 9/5077 |
| 10,782,949 B2* | 9/2020 | Hwang | H04L 69/40 |
| 11,403,128 B2* | 8/2022 | Toeroe | G06F 11/30 |
| 2006/0130042 A1* | 6/2006 | Dias | G06F 8/656 717/168 |
| 2009/0106748 A1 | 4/2009 | Chess et al. | |
| 2012/0102480 A1* | 4/2012 | Hopmann | G06F 8/656 717/172 |
| 2013/0024862 A1* | 1/2013 | Lim | G06F 8/656 718/1 |
| 2013/0042139 A1 | 2/2013 | Bhalerao et al. | |
| 2013/0111349 A1* | 5/2013 | Yan | H04L 41/5096 715/738 |
| 2013/0247022 A1 | 9/2013 | Dejana et al. | |
| 2015/0293821 A1* | 10/2015 | Jagtiani | H04L 67/10 714/4.11 |
| 2016/0099847 A1* | 4/2016 | Melander | H04L 41/5051 709/222 |
| 2016/0197844 A1 | 7/2016 | Smith et al. | |
| 2016/0266938 A1* | 9/2016 | Suzuki | G06F 9/45558 |
| 2016/0364258 A1* | 12/2016 | Katihar | G06F 8/60 |
| 2017/0371650 A1 | 12/2017 | Li et al. | |
| 2018/0067736 A1 | 3/2018 | De Zaeytijd et al. | |
| 2018/0241617 A1 | 8/2018 | Radzikowski et al. | |

OTHER PUBLICATIONS

Nabi et al.; "An Approach for the Automation of IaaS Cloud Upgrade"; https://doi.org/10.48550/arXiv.2103.12837; (Nabi_2021.pdf; pp. 1-20) (Year: 2021).*
Amazon_EC2_Auto_Scaling_User_Guide; 2019; 179 pages.
Amazon Web Services Documentation: "AWS::AutoScaling::ScheduledAction"; 2019; 6 pages.
I Neamtiu et al.: "Cloud Software Upgrades: Challenges and Opportunities"; 2011; 10 pages.
Tudor Dumitras: "Dependable, Online Upgrades in Enterprise Systems"; Oct. 25-29, 2009, Orlando, Florida, USA; 2 pages.
Elastic Beanstalk Developer Guide API Version_Dec. 1, 2010; 831 pages.
Eric A. Brewer: "Lessons from Giant-Scale Services"; Copyright 2001, IEEE Computer; 10 pages.
D. Sun et al.: "Multi-objective Optimisation of Rolling Upgrade Allowing for Failures in Clouds"; 2015 IEEE 34th. Symposium on Reliable Distributed Systems; 6 pages.
D. Sun et al.: "Quantifying Failure Risk of Version Switch for Rolling Upgrade on Clouds"; 2014 IEEE Fourth International Conference on Big Data and Cloud Computing; 8 pages.
T. Das et al.: "Quantum Leap Cluster Upgrade"; 2009; 4 pages.
D. Sun et al.: "R2C Robust Rolling-Upgrade in Clouds"; IEEE Transactions on Dependable and Secure Computing, vol. 15, No. 5, Sep./Oct. 2018; 13 pages.
M. Nabi et al.: "Rolling Upgrade with Dynamic Batch Size for IaaS Cloud"; 2016 IEEE 9th. International Conference on Cloud Computing; 8 pages.
V. Gramoli et al.: "Rollup: Non-Disruptive Rolling Upgrade with Fast Consensus-Based Dynamic Reconfigurations"; IEEE Transactions on Parallel and Distributed Systems, vol. 27, No. 9, Sep. 2016; 14 pages.
T. Dumitras et al.: "Toward Upgrades-as-a_Service in Distributed Systems"; 2009; 2 pages.
Amazon Web Services Documentation; "UpdatePolicy Attribute"; 2019; 18 pages.
M. Nabi et al.: "Upgrade of the IaaS Cloud"; 2015 IEEE; 4 pages.
T. Dumitras et al.: "Why Do Upgrades Fail and What Can We Do about it? Toward Dependable, Online Upgrades in Enterprise System"; 2009; 24 pages.
B. Calder et al.: "Windows Azure Storage : A Highly Available Cloud Storage Service with Strong Consistency"; Oct. 23-26, 2011; 15 pages.
"Mechanisms for SLA provisioning in cloud-based service providers"; Computer Networks 2013; 16 pages.

* cited by examiner

Possible Partitioning

Partition 1 = {R1,R2}
Partition 2 = {R4,R4}

Partition 1 = {R7,R1,R2,R3}
Partition 2 = {R8,R4,R5,R6}

Partition 1 = {R7,R1,R3,R5}
Partition 2 = {R8,R2,R4,R6}

Partition 1 = {R13,R9,R11,R1,R3,R5,R7}
Partition 2 = {R14,R10,R12,R2,R4,R6,R8}

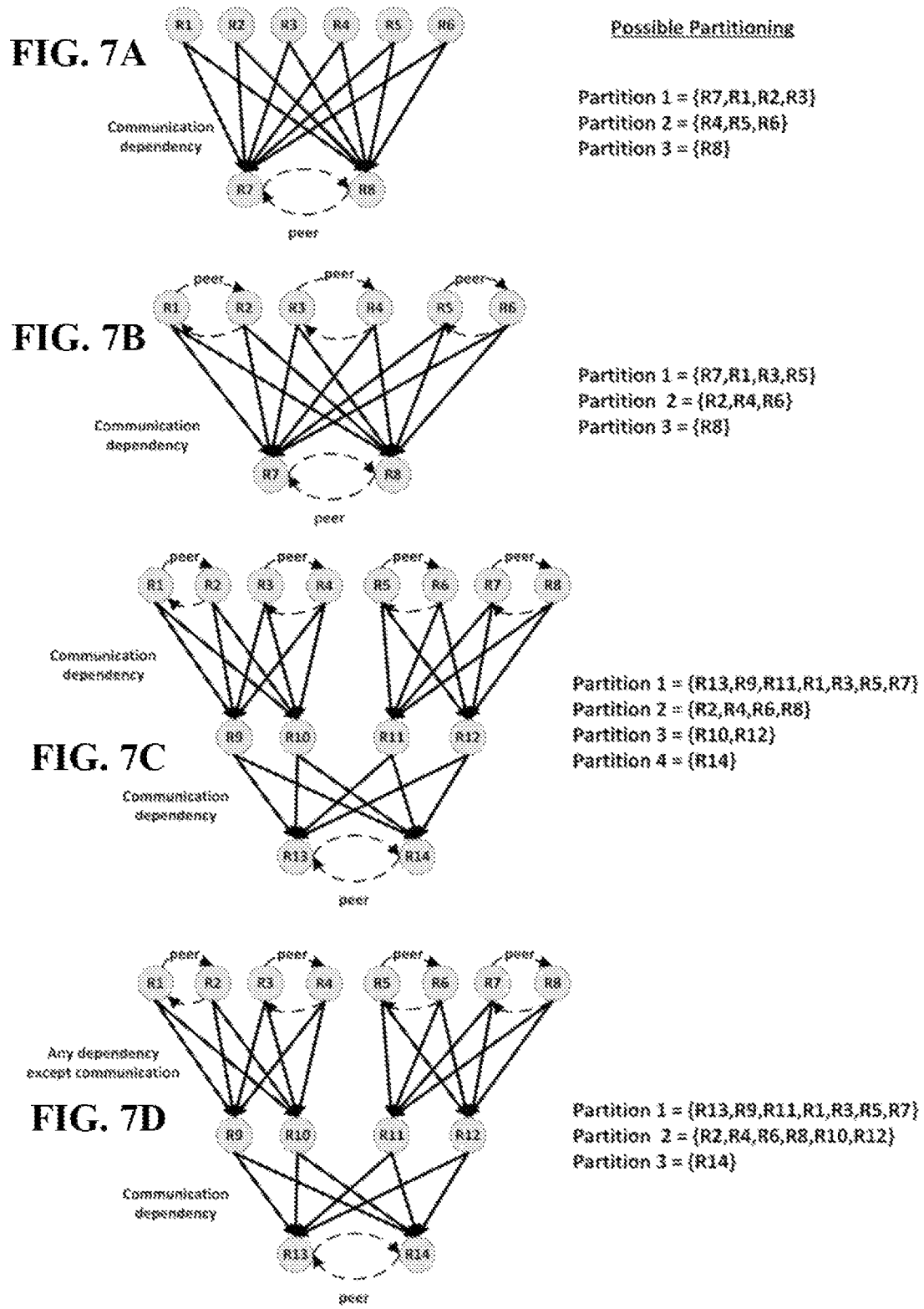

AUTOMATION OF MANAGEMENT OF CLOUD UPGRADES

CROSS-REFERENCE TO RELATED APPLICATIONS

This application claims the benefit of U.S. Provisional Application No. 62/714,917 filed on Aug. 6, 2018.

TECHNICAL FIELD

Embodiments of the invention relate to the management of resource upgrades in a cloud environment.

BACKGROUND

In the Infrastructure as a Service (IaaS) cloud service model, there are three types of resources: physical resources, virtualization facilities (also called virtualization resources) and virtual resources (also called virtualized resources). The physical resources are the hardware of the infrastructure on which the rest of this layer is running. Virtual resources are resources provided as services built on top of the physical resources by using the virtualization facilities.

During their life-cycle, these resources are upgraded multiple times. The service delivered by the IaaS layer may be affected during these upgrades. Some systems have limited tolerance for service interruption. Some of these systems or their subsystems have a requirement of High Availability (HA), e.g. their services should be available 99.999% of the time; in other words, should not experience a downtime of more than five minutes and 26 seconds per year including downtime due to upgrade. Indeed, a cloud provider is committed to a tenant by a Service Level Agreement (SLA), which indicates the terms of commitment, e.g. the level of availability even during upgrades.

There are several challenges for maintaining availability during upgrades of the IaaS. In the IaaS layer as well as in other layers, resources may depend on other resources. Breaking any of the dependencies between resources during upgrades may cause service outages during the upgrades. Moreover, in the upgrade process, incompatibilities that do not exist in the current or in the target configuration may arise during the transition and break the dependencies. Additionally, upgrade actions performed on the resources may fail and such failures may jeopardize the consistency of the system configuration.

The dynamicity of cloud systems introduces additional challenges for upgrades. Cloud systems adapt to workload changes by provisioning and de-provisioning resources automatically according to the workload variations. This mechanism is referred to as autoscaling or elasticity. This dynamicity poses a challenge for maintaining the SLAs during upgrades. Indeed, the autoscaling feature may interfere with the upgrade process in different ways. The service capacity of the system decreases during the upgrade when resources are taken out of service for the upgrade. In the meantime, the system may need to scale out in response to workload increase. Furthermore, the autoscaling may undo or hinder the process of the upgrade when scaling-in releases newly upgraded resources (e.g. VMs), or when scaling-out uses the old (i.e. not yet upgraded) version of the resources. Therefore, for many conventional systems the autoscaling feature is disabled during the upgrade.

There are different upgrade methods (e.g. rolling upgrade, split mode and delayed switch) proposed for maintaining high availability during the upgrade of clustered systems. However, none of these methods addresses all of the challenges of upgrades of the cloud environment. For instance, Windows® Azure Storage uses rolling upgrade to partition the system into subsystems and upgrade them one at a time. However, the rolling upgrade method may introduce mixed-version inconsistencies in case of incompatibility between the different versions of a redundant resource. Other solutions propose the parallel universe method to address incompatibility issues (i.e. mixed-version inconsistencies). In this case an entirely new system is created with the new configuration, while the old system continues serving. However, applying this parallel universe method can be very costly since an entire new IaaS cloud system is created with the new version of the resources.

There is a need for automating the entire upgrade process for an IaaS system due to the size of cloud deployments and for the purpose of supporting zero-touch operations. Such automation may include selecting the appropriate upgrade methods and orchestrating the upgrade process properly to avoid, or at least limit, service outages during the upgrade.

SUMMARY

In one embodiment, there is provided a method for upgrading resources in a system providing IaaS in an iterative process. The method comprises receiving an upgrade request indicating requested changes to a current configuration of the system; and creating, in response to the upgrade request, one or more graph representations of the current configuration and the requested changes. The one or more graph representations include a control graph having vertices representing resource groups of one or more resources each and edges representing dependencies among the resource groups. The method further comprises identifying, from the resource groups, a batch of one or more resource groups to upgrade in a current iteration based on the dependencies and SLA requirements including availability and elasticity of the system; and executing upgrade operations on the identified batch using selected one or more upgrade methods which handle potential incompatibilities during a transition between the current configuration and an upgraded configuration of the system. The method further comprises updating the one or more graph representations to include any new requested changes and recovery operations in response to feedback of failed upgrade operations, identifying a next batch of one or more resource groups to upgrade in a next iteration, and upgrading remaining one or more resource groups.

In another embodiment, there is provided a network node comprising processing circuitry and memory. The memory stores instructions executable by the processing circuitry. The network node is operative to perform the aforementioned method for upgrading resources in a system providing IaaS in an iterative process.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

FIGS. 7A, 7B, 7C and 7D illustrate examples of resource partitioning for upgrade units with the modified split mode.

DETAILED DESCRIPTION

Figure 1:
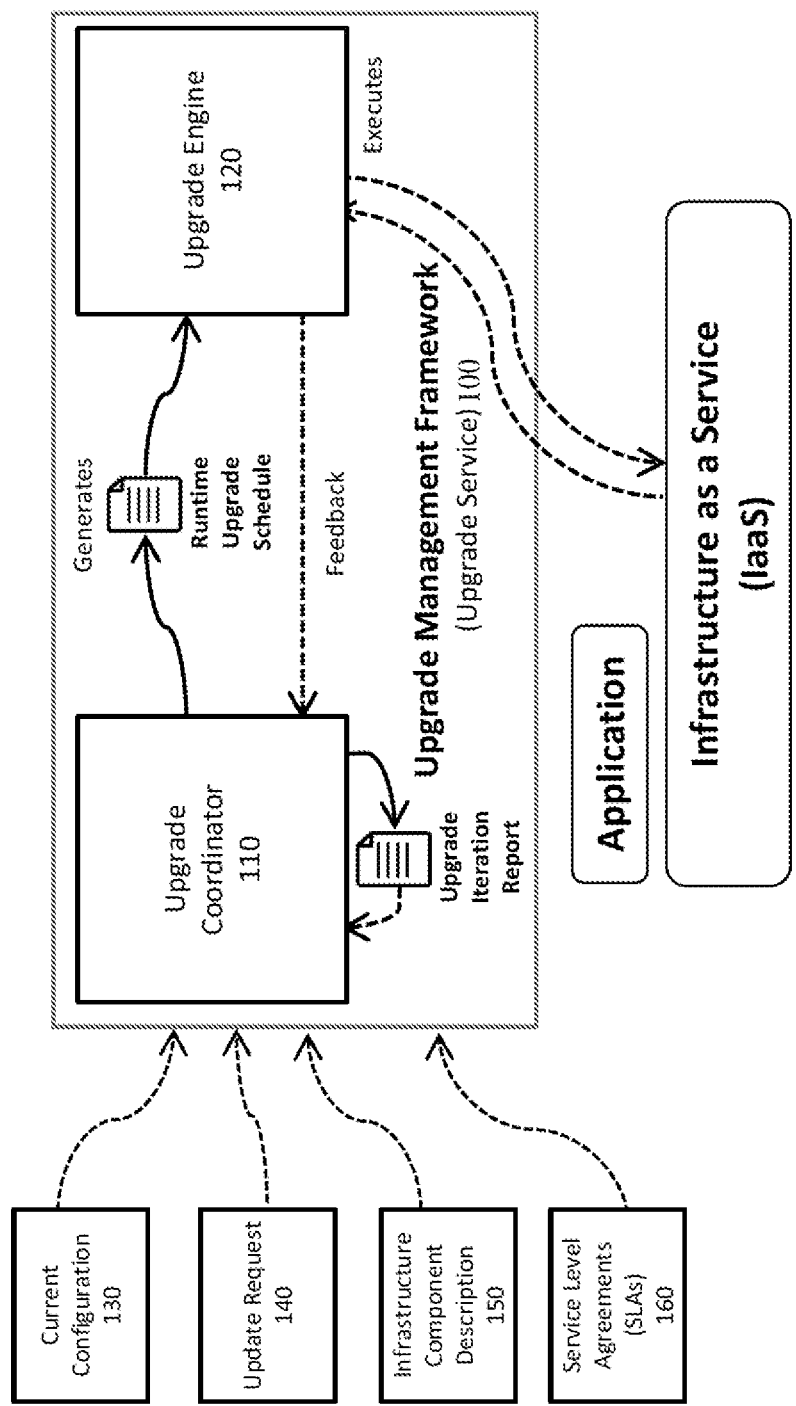
FIG. 1 illustrates an upgrade management framework for the upgrade of IaaS cloud systems according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A method is provided for automating the upgrade of IaaS cloud systems, according to the upgrade requests specified by an administrator, and under SLA constraints for availability and elasticity. The disclosed method is applicable to upgrade of all kinds of IaaS resources (e.g. computing resources, network resources and storage resources). A system for performing the disclosed method is also provided.

The disclosed method determines and schedules the upgrade methods and actions appropriate for the upgrade requests in an iterative process. To prevent service outage due to existing dependencies, at runtime the method identifies the resources that can be upgraded without violating dependency compatibility requirements according to the configuration of the system. The potential incompatibilities along the dependencies are determined using information coming from cloud vendors and handled using appropriate upgrade methods according to the types of dependencies. In addition, the amount of additional resources is minimized by identifying the subsystems where additional resources are required for the upgrade process. This approach avoids interferences between the upgrade and the autoscaling processes by regulating the pace of the upgrade according to the state of IaaS cloud systems with respect to SLAs. Accordingly, the upgrade starts/resumes if and only if resources can be taken out of service and upgraded without jeopardizing the availability of the IaaS services. To maintain the consistency of the system configuration, in case of failures during the upgrade, the necessary retry and undo operations are identified and issued automatically, as appropriate for the failed upgrade actions. This approach is also capable of handling new upgrade requests even during ongoing upgrades, which makes it suitable for continuous delivery.

Embodiments of the invention automate the management of the upgrade of IaaS resources based on the dependencies between the resources and the compatibility information for those dependencies. The resources are grouped accordingly, and an appropriate upgrade method is selected for them. The disclosed method considers the availability and elasticity constraints, i.e. making sure that VMs are impacted according to their anti-affinity grouping and allows for scaling-out operations even during an ongoing upgrade within the scope of the relevant SLA requirements. These features are made possible because the upgrade is performed in iterations. In each iteration, changes to the system (e.g. scaling), failures in previous iterations and new upgrade requests are taken into account. Thus, the process adapts to the system's state, and may stop and restart according to the availability of resources for the upgrade. The disclosed method is also suitable for continuous operation and deployment. The disclosed method is applicable to systems with similar dependencies, i.e. it can be applied to other layers of the cloud architecture.

Before describing further details of the disclosed method, it is helpful to explain some terminologies used throughout the disclosure. An infrastructure component is a piece of software, firmware, or hardware delivered by a vendor as part of a product. The product itself can be a single component (e.g. ESXi hypervisor) or a compound product consisting of different components (e.g. Ceph storage with different components). When a product is fully installed in the IaaS system, this installation becomes a resource (e.g. ESXi hypervisor, Ceph storage) and may consist of the installation of multiple components. Thus, multiple IaaS resources can be mapped to the same infrastructure component (e.g. ESXi hypervisor installed on different hosts) and multiple infrastructure components can be mapped to a single IaaS resource (e.g. Ceph storage with components running on different hosts). Each infrastructure component is accompanied with a file, the infrastructure component description, which describes among others the component's service capabilities, configuration constraints, hardware management capabilities, delivering software/firmware bundle with their installation/upgrade/removal scripts/commands, estimated time required for their installation/removal, and hardware/software dependencies.

Next, the terms "actions," "operations" and "units" are explained. To deploy a change in the IaaS cloud system, one or more upgrade actions may need to be executed. An upgrade action is defined as an atomic action that can be executed by a configuration management tool (e.g. Ansible) on a resource (e.g. a command for installing ESXi on a host), or performed by an administrator on a resource (e.g. removing a host). An upgrade action is associated with one or more undo actions. Undo actions revert the effect of the upgrade actions on the resource. The term upgrade operation is used to represent an ordered list of upgrade actions. The term undo operation is used to represent an ordered list of undo actions; while a retry operation is defined as a retry of an upgrade operation. A recovery operation is defined as undo and/or retry operations.

An upgrade unit is defined as a group of resources that have to be upgraded using an appropriate upgrade method, for example, for handling the incompatibilities, which may arise during the upgrade; i.e. during the transition from the source configuration to the target configuration. The resources of an upgrade unit are selected based on the possible incompatibilities along the dependencies of the resources. The upgrade operations of the resources in an upgrade unit are ordered based on the associated upgrade method, which prevents communication between incompatible versions during the upgrade. An undo unit consists of a group of resources on which an upgrade operation has to be applied all together. Otherwise, the undo operation is triggered. The goal of this grouping is to preserve the consistency of the system configuration with respect to the changes to the IaaS cloud system.

The system administrator initiates an upgrade by specifying an upgrade request, which is a collection of change sets, i.e. a set of change sets. Each change set in the collection specifies a set of tightly coupled changes on the IaaS resources that either succeed or fail together to maintain the consistency of the system configuration. Within each change set, each change indicates the addition, removal, or upgrade of an infrastructure component of some resources, some resources themselves, or a dependency between two resources or their sets. Note that the change sets in an upgrade request are independent of each other, and a failure of a change set does not impact the consistency of the system with respect to other change sets.

A system administrator may not be aware of all the dependencies and, therefore, may not specify all the necessary changes in a change set, i.e. a change set may be incomplete. To satisfy the hardware and/or software dependencies indicated in the infrastructure component description by the vendor, an upgrade request initiated by a system administrator may require complementary changes. To address this issue, the completeness of each change set is checked with respect to the infrastructure component description(s) provided by the vendor(s) to derive any missing changes. These missing changes are then added as complementary changes to the same change set. For each change, the necessary upgrade actions have to be derived from the infrastructure component description. The description contains the scripts used to install and remove a software component, while for a hardware component the scripts are used for its management.

The administrator can also specify additional parameters in the upgrade request with respect to retry and undo operations. To ensure the completion of the upgrade process, i.e. limit its time, for each change set a max-retry threshold and a max-completion-period can be specified. To ensure the consistency of the system for each change (in a change set), an undo-threshold parameter and an undo version can be specified. The usage of these four parameters will be described in detail later in the disclosure.

An upgrade request model may be used to keep track of upgrade requests. This model includes all the information necessary to track the process of applying the changes to the system including failure handling. The execution status of change sets and of changes within each set indicates whether they are new, scheduled, completed, or failed. Whenever a new upgrade request is issued, its change sets, including their respective complementary changes, are added to the upgrade request model. For each change in each change set, the target resources, their source, target and undo versions are reflected, and the execution status is maintained. The target resources and their source versions are identified from the current configuration.

The disclosed method addresses the following challenges for maintaining availability during IaaS cloud upgrades: (1) dependency of the application (SaaS) layer on the IaaS layer, (2) resource dependencies, (3) potential incompatibilities along the dependencies during the upgrade process, (4) upgrade failures, (5) the dynamicity of the cloud environment, and (6) keeping the amount of additional resources at minimum.

First, the challenge of the dependency of the application layer on the IaaS layer is described. Upgrading the IaaS cloud system can impact the other cloud layers—such as application layer—relying on the IaaS layer. Thus, handling the existing dependency between layers enables the prevention of service outages during upgrades. The availability management responsibilities of the IaaS layer are different from those of the application layer. The IaaS is not responsible for providing availability solution for protecting the availability of the application deployed in the VMs. The availability of the application deployed in the VMs may be maintained by an availability management solution such as the Availability Management Framework. To handle the dependency of the application layer running on the IaaS layer, it is assumed that the requirements of the application level redundancy are expressed towards the IaaS cloud as VM placement constraints (i.e. as anti-affinity groups). To respect these requirements, during upgrade, VM migration or VM consolidation, the VMs of the same group will be placed on different physical hosts and at most a specified number (typically one) of VMs of an anti-affinity group will be impacted at a time.

The challenge of resource dependencies is described herein. To handle resource dependencies, the different kinds of IaaS resources and the dependencies between them are identified. IaaS resource dependencies fall into two main categories, Sponsorship and Symmetrical dependencies with different subcategories. During the upgrade, to avoid any resource dependencies violation the upgrade has to be performed in a specific order, which is based on the nature of the dependencies. Moreover, to maintain availability, the resources cannot be upgraded all at the same time. As a solution, an iterative upgrade process may be used to select at the beginning of each iteration, the resources that can be upgraded without violating any dependency in that iteration. The situation is re-evaluated at the beginning of each subsequent iteration before continuing with the upgrade. For this selection, first the resources that have to be upgraded at the same time are grouped together, and then the resource groups that can be upgraded in the current iteration are identified using a set of rules, referred to as elimination rules. This results in an initial selection referred to as the initial batch, in which the resource groups are selected based on their dependencies. There are other criteria which will further narrow down this initial selection.

The challenge of potential incompatibilities along resource dependencies during upgrade is described herein. Even though the source and the target configurations on their own have no incompatibilities, during the transition from one configuration to the other, incompatibilities may occur since the availability of services needs to be maintained. That is, for the time of the upgrade version mismatch may happen along some of the dependencies for some of the resources. To avoid such incompatibilities these resources have to be upgraded in a certain order using an appropriate upgrade method. The disclosed method identifies automatically the resources that might have incompatibilities along their dependencies during the upgrade and groups them into upgrade units. Each upgrade unit groups together the resources that have to be upgraded using an appropriate upgrade method, which avoids incompatibilities by preventing any communication between resources of the incompatible versions. Thus, within an upgrade unit the upgrade of resources is ordered according to the associated upgrade method and the elimination rules used for the batch selection ensure that the resources of the same upgrade unit are selected according to the associated upgrade method. For example, the split mode may be used to avoid incompatibilities along certain dependencies. In this method, the resources of an upgrade unit are divided into two partitions which are upgraded one partition at a time. The elimination rules ensure that only one partition is selected at a time, and that the order of deactivation and activation of the partitions is such that it avoids any incompatibilities by having only one version active at any given time until both partitions are upgraded.

Due to ordering constraints, the required upgrade actions on a resource may be required to be applied in different iterations. Execution-level is defined as an ordered list of upgrade actions to be executed on a resource in a single iteration. Also, actions-to-execute is defined as an ordered list of execution-levels to be executed on the resource through different iterations. Thus, the execution-levels order the upgrade actions on a resource, among others, to handle incompatibilities. Each execution-level on a resource is associated with an upgrade unit. In each iteration, based on the upgrade unit the elimination rules may or may not remove the resource from the initial batch depending on the order required by the associated upgrade method. Whenever a resource remains in the final batch of the iteration (i.e. the resource batch to be upgraded in this iteration), the upgrade actions of its first execution-level will be executed in that iteration. After successful execution of all the upgrade actions of the first execution-level, the execution-level (with all its upgrade actions) is removed from the list of execution-levels of the actions-to-execute of the resource. Therefore, the next execution-level becomes the first one to be executed in a subsequent iteration whenever the resource is selected again for the final batch.

Upgrade units are also used to handle, for instance, potential incompatibilities introduced by new upgrade requests. Even if the new upgrade requests target the same resources as previous upgrade requests, the new upgrade requests may introduce new incompatibilities. To prevent such incompatibilities occurring, new upgrade units different from existing ones are created. The upgrade actions associated with the new upgrade request can only be executed on a resource after finalizing the upgrade actions of the ongoing upgrade requests. To achieve this, upgrade actions associated with a new upgrade unit are grouped into a new execution-level.

The challenge of handling upgrade failures is described herein. In case of upgrade failure, recovery operations are performed to bring the system to a consistent configuration. Since changes in a change set are dependent, there are two main criteria to guarantee a consistent configuration: First, all the upgrade actions deploying a change set on a resource need to be either applied successfully, or none of them should be applied at all. Second, all the changes in a change set have to be successful without violating their undo thresholds; otherwise, they have to be undone altogether.

According to the first criterion, in case an upgrade action of a change set fails on a resource, the effects of the already executed upgrade actions of that set need to be reverted. This is referred to as resource level undo, which takes the resource to the version before applying the upgrade actions of the change set. If this is successful and the retry operation is permitted on the resource (i.e. the max-retry threshold) is not reached yet, another attempt can be made to re-execute the upgrade actions of the set. Otherwise if reverting the upgrade actions was successful (i.e. the previous stable configuration is reached), but the retry operation is not permitted, the resource will be isolated from the system. A resource, which is isolated but not failed, is referred to as an isolated-only resource. However, if reverting the upgrade actions fails, the resource needs to be isolated and marked as failed. If the number of isolated-only and failed resources in the set of resources to which a change is applied violates the undo-threshold value, all changes of the change set will be undone on all applicable resources to preserve the system consistency. This undo operation is referred to as system level undo, because it is performed at the system level and considers the entire the change set. An undo unit is defined as a group of resources on which the undo recovery operation has to be applied together. Thus, an undo unit is assigned to each change set and its targeted resources to maintain the relation of changes applicable to those resources that either need to be deployed altogether or undone. The undo operation could be triggered as discussed: if the undo-threshold for a set is violated; if all the upgrade actions of the set cannot be finalized within the indicated max-completion-period; or if the administrator explicitly issues an undo operation for a change set that has not been completed yet. Once a change is completed it cannot be undone, instead a new change can be requested. When undoing a change in the system level with respect to a change set, all the targeted resources will be taken to the undo version of that change. Note that this undo version specified by the administrator indicates the desired version for the undo operation of the change set and it may be different from the original version of the resource before applying the upgrade actions of the change set. The isolated-only resources may or may not be at the undo version. This is because the isolated-only resources which had a successful resource level undo operation, is taken to the version at the moment the change is applied (not the undo version). If isolated-only resources are at the undo version, they are released from the isolation. Otherwise an attempt is made to take them to the undo version. If this is unsuccessful, they are marked as failed resources.

Note that, there may be several change sets impacting a single resource. Each resource may be associated with several undo units. In the disclosed method when an undo operation is performed (e.g. due to an upgrade failure), the undo operation is localized to the resources targeted by the originating change set (i.e. those in the undo unit associated with the change set) instead of undoing all the changes made in the system. The undo operation itself is represented as a change set on the relevant resources and, thus, it can be performed while other change sets are being applied to other parts of the system. The undo actions for the undo operation are organized into the first execution level of the resources so that they will be executed first.

The challenge of dynamicity of the cloud environment is described herein. To handle the interferences between autoscaling and the upgrade process, the pace of the upgrade process is regulated. To respect the SLA commitments (scaling and availability), in each iteration the current configuration of the system is taken into consideration and only a certain number of resources can be taken out of service for upgrade. Based on the current configuration, it is determined in each iteration the number of resources necessary for accommodating the current service workload, for any potential scaling out requests, and for recovering from potential failures calculated for the duration of that iteration. These cannot be upgraded without potential violation of availability. So, from the initial batch of resources selected with respect to their dependencies, these resources are eliminated and only the remaining subset can be upgraded. This remaining subset is referred to as the final batch. The upgrade process starts/resumes if and only if at least one resource can be taken out (i.e. the final batch is not empty) and upgraded without violating the availability and elasticity constraints due to potential resource failures or valid scaling requests. Otherwise, the upgrade process is suspended until there is enough resources freed up, for example, through the process of scaling in.

The challenge of minimizing the amount of required additional resources is described herein. Since upgrade takes out resources from the system providing additional resources temporarily to the system may become necessary for progressing with the upgrade. The amount may depend on the upgrade method, the number of resources the upgrade is applied to and the spare capacity in the system at the moment it is applied. It may be necessary to add resources to enable the use of certain techniques to maintain service continuity and service availability especially in the presence of incompatibilities. Some of the existing upgrade solutions use the parallel universe method to avoid incompatibilities. Applying the parallel universe method at the system level is expensive in terms of resources. The idea is to use only the minimum necessary additional resources to keep the cost of the upgrade as low as possible. The disclosed method identifies the subsystem where additional resources are required, and only uses the minimum amount necessary.

To maintain the continuity of the infrastructure services supporting VM operations (e.g. storage, controller) when their resources need to be upgraded and when the new and the old versions are incompatible, a Partial Parallel Universe (PPU) method is proposed herein. This method applies the parallel universe method locally to a subsystem (e.g. storage or controller subsystem) instead of creating a complete IaaS system as a parallel universe.

With the PPU method, the disclosed method creates a new configuration of the VM supporting infrastructure resources with their new version while (in parallel) keeping the old version of such infrastructure resources and their configuration until the new one can take over the support for all the VMs. To achieve the transfer, the physical hosts providing the VM service of the IaaS (i.e. the compute hosts) are also divided into two partitions. The old partition hosts VMs compatible with the old version of the VM supporting infrastructure resources and it hosts all the VMs initially. The new partition, which is empty initially, hosts the VMs compatible with the new version of the VM supporting infrastructure resources. As soon as the new version of the VM supporting infrastructure resources is ready, the VMs are migrated from the old to the new partition potentially in multiple iterations as appropriate for their SLAs. Once all the VMs have been migrated from the old partition to the new one, the configuration of the VM supporting infrastructure resources with the old version can be safely removed.

Thus, to guarantee the continuity of the VMs supporting services, the requirements for both versions of the configurations of VM supporting infrastructure resources have to be satisfied simultaneously during the upgrade and up until the completion of the VM migrations. If these requirements cannot be satisfied using existing resources, additional resources may be required. The disclosed method keeps the number of required additional resources to a minimum by trying to use available resources as much as possible during the upgrade and request for additional resources only if they are necessary.

FIG. 1 illustrates an upgrade management framework 100 for the upgrade of IaaS cloud systems according to one embodiment. Among others, the framework 100 takes into account the SLA constraints of availability and elasticity. The framework 100 includes two main components, an upgrade coordinator 110 to coordinate the process of the upgrade, and an upgrade engine 120 to execute the upgrade actions necessary to deploy in the system the requested upgrade.

The upgrade coordinator 110 keeps track of the upgrade requests and decides about the upgrade process in an iterative manner. For each iteration it generates one or more Runtime Upgrade Schedule(s), each of which is a collection of upgrade actions and the set of resources on which they need to be applied. The runtime upgrade schedule is generated to overcome the challenges described previously in this disclosure. The upgrade coordinator 110 uses as input the current configuration 130 of the system, the change sets indicated in the upgrade request(s) 140, the infrastructure component descriptions 150 provided by the vendors, and SLAs 160 of the existing tenants as input to generate the schedule.

To generate the upgrade schedules for each iteration, the upgrade coordinator 110 takes into account the dependencies, potential incompatibilities, and SLA constraints for availability and elasticity, as well as actions necessary for handling failures of previous iterations. Resource level failures are handled within a given iteration, while system level failures are handled in subsequent iterations.

To keep track of the upgrade requests 140, the upgrade coordinator 110 creates an upgrade request model. This model includes the change sets including the complementary changes and their execution status for each upgrade request. Based on the infrastructure component descriptions 150, the upgrade coordinator 110 infers any complementary changes necessary to satisfy all the dependencies and it identifies all the upgrade actions needed to deploy the different change sets and generates the runtime upgrade schedule(s).

The upgrade engine 120, an engine capable of running upgrade actions on IaaS resources, executes the upgrade actions specified in the runtime upgrade schedule received from the upgrade coordinator 110. Note that in the case of hardware resources, the upgrade engine 120 may request administrative assistance for actions such as replacement of a piece of hardware. However, the upgrade engine 120 can bring the resources to the required state and signal when the assistance is necessary and on which piece of hardware.

After the execution of an upgrade schedule, the upgrade engine 120 provides feedback to the upgrade coordinator 110 indicating the results including any failed upgrade action. Based on this feedback, the upgrade coordinator 110 may create a new runtime upgrade schedule to handle the failed upgrade actions at the resource level, i.e. to bring them into a stable configuration. Once all failures are handled for the iteration, the upgrade coordinator 110 creates an Upgrade Iteration Report as an additional (to those used for the first iteration) input for the next iteration of the runtime upgrade schedule(s) generation. The upgrade iteration report indicates the failed and/or isolated-only resources and failed undo units of the iteration. Based on these, in the subsequent iteration(s) the upgrade coordinator can issue the retry or undo operations as appropriate at the system level considering all the relevant dependencies including those defined by the grouping of requested changes in the upgrade request.

This iterative approach also supports continuous delivery. That is, new upgrade requests may be requested at any time during an ongoing upgrade. The upgrade coordinator 110 takes into account these new upgrade requests, adds them to the upgrade request model, infers the complementary changes as necessary, and extracts the upgrade actions corresponding to the changes. The new requests will be applied to the system in subsequent iterations as applicable. The process continues until all outstanding upgrade requests have been handled.

The following description provides preliminaries and definitions of an IaaS cloud system. An IaaS data center is defined as: a set of physical hosts providing compute services ($M_{compute}$), a set of physical hosts providing virtual storage ($M_{storage}$), a set of physical hosts dedicated to network services ($M_{network}$), and another set dedicated to controller services ($M_{controller}$), and a set of other physical resources for networking (e.g. switch, router) and for storage (physical storage). Note that $M_{compute}$ and $M_{storage}$ may intersect. The size of any of these sets may change over time and during the upgrade due to failures and/or cloud elasticity. It is assumed that all the physical hosts in $M_{compute}$ have a capacity of K VMs.

The number of tenants may also vary over time including during upgrade. As the disclosed method applies the changes in an iterative manner, the number of tenants served by the IaaS cloud at iteration i is denoted by $N_i$. Each of the tenants has a number of VMs which may vary between $min_n$ and $max_n$. They represent, respectively, the minimum and the maximum number of VMs of the $n^{th}$ tenant that the IaaS provider agreed to provide in the respective SLA. The SLA of each tenant also specifies a scaling adjustment $s_n$ value and a cooldown duration $c_n$, which represent the maximum size of the adjustment in terms of VMs in one scaling operation to be satisfied by the IaaS provider and the minimum amount of time between two subsequent scaling operations. These parameters define the SLA elasticity constraints.

In one embodiment, the availability of the applications deployed in the VMs is managed by an availability management solution. The requirements of the application level redundancy are expressed towards the IaaS cloud as VM placement constraints (i.e. as anti-affinity groups), which are respected during the upgrade. This means not only that VMs of the same group should be placed on different physical hosts, but also that at most a specified number (typically one) of VMs of a group can be impacted at a time. The VMs of a tenant may form several anti-affinity placement groups.

TABLE I lists the definitions of all the parameters used in the rest of this disclosure.

TABLE II

Parameters used in the Disclosed method

| Symbols | Description | Symbols | Description |
|---|---|---|---|
| K, K' | Host capacity in terms of VMs (before and after a hypervisor upgrade) | $M_{network}$ | Set of hosts dedicated to networking services |
| $N_i$ | Number of tenants in iteration i | $M_{controller}$ | Set of hosts dedicated to controller services |
| $min_n$ | Minimum number of VMs for tenant n | $M_{computeForOldVM}$ | Set of compute hosts capable of hosting VMs of the old version |
| $max_n$ | Maximum number of VMs for tenant n | $M_{computeForNewVM}$ | Set of compute hosts capable of hosting VMs of the new version |
| $c_n$ | Cooldown time for tenant n | $M_{usedCompute}$ | Set of in-use compute hosts |
| $s_n$ | Scaling adjustment in terms of VMs per cooldown time for tenant n | $M_{usedComputeForOldVM}$ | Set of in-use compute hosts with VMs of the old version |
| $S_i$ | Maximum scaling adjustment requests per tenant that may occur during iteration i | $M_{usedComputeForNewVM}$ | Set of in-use compute hosts with VMs of the new version |
| $T_i$ | Upgrade time of the batch of iteration i | $ScalingResv_{forOldVM}$ | Number of compute hosts reserved for scaling of VMs of the old version |
| F | The number of compute host failures to be tolerated during an iteration | $ScalingResv_{forNewVM}$ | Number of compute hosts reserved for scaling of VMs of the new version |
| $A_i$ | Number of tenants who might scale out on hosts compatible with the old VM version in iteration i | $FailoverResv_{forOldVM}$ | Number of compute hosts reserved for failover of VMs of the old version |
| $Z_i$ | The maximum number of compute hosts that can be taken out of service in iteration i | $FailoverResv_{forNewVM}$ | Number of compute hosts reserved for failover of VMs of the new version |
| $V_i$ | The total number of VMs to be upgraded in iteration i | $MinHostReqConf_{oldStorage}$ | Minimum required number of storage hosts for the old configuration of the virtual storage |

TABLE II-continued

Parameters used in the Disclosed method

| Symbols | Description | Symbols | Description |
| --- | --- | --- | --- |
| $W_{ij}$ | The batch size in terms of VMs where each VM belongs to a different anti-affinity group in the main iteration i and sub-iteration j | $MinHostReqConf_{newStorage}$ | Minimum required number of storage hosts for the new configuration of the virtual storage |
| $M_{Storage}$ | Set of hosts eligible to participate in the creation of virtual storage (storage hosts) | $MinHostReqCap_{oldStorage}$ | Minimum required number of storage hosts for data of VMs of the old version |
| $M_{compute}$ | Set of hosts eligible to provide compute services (compute hosts) | $MinHostReqCap_{newStorage}$ | Minimum required number of storage hosts for data of VMs of the new version |

Figure 2:
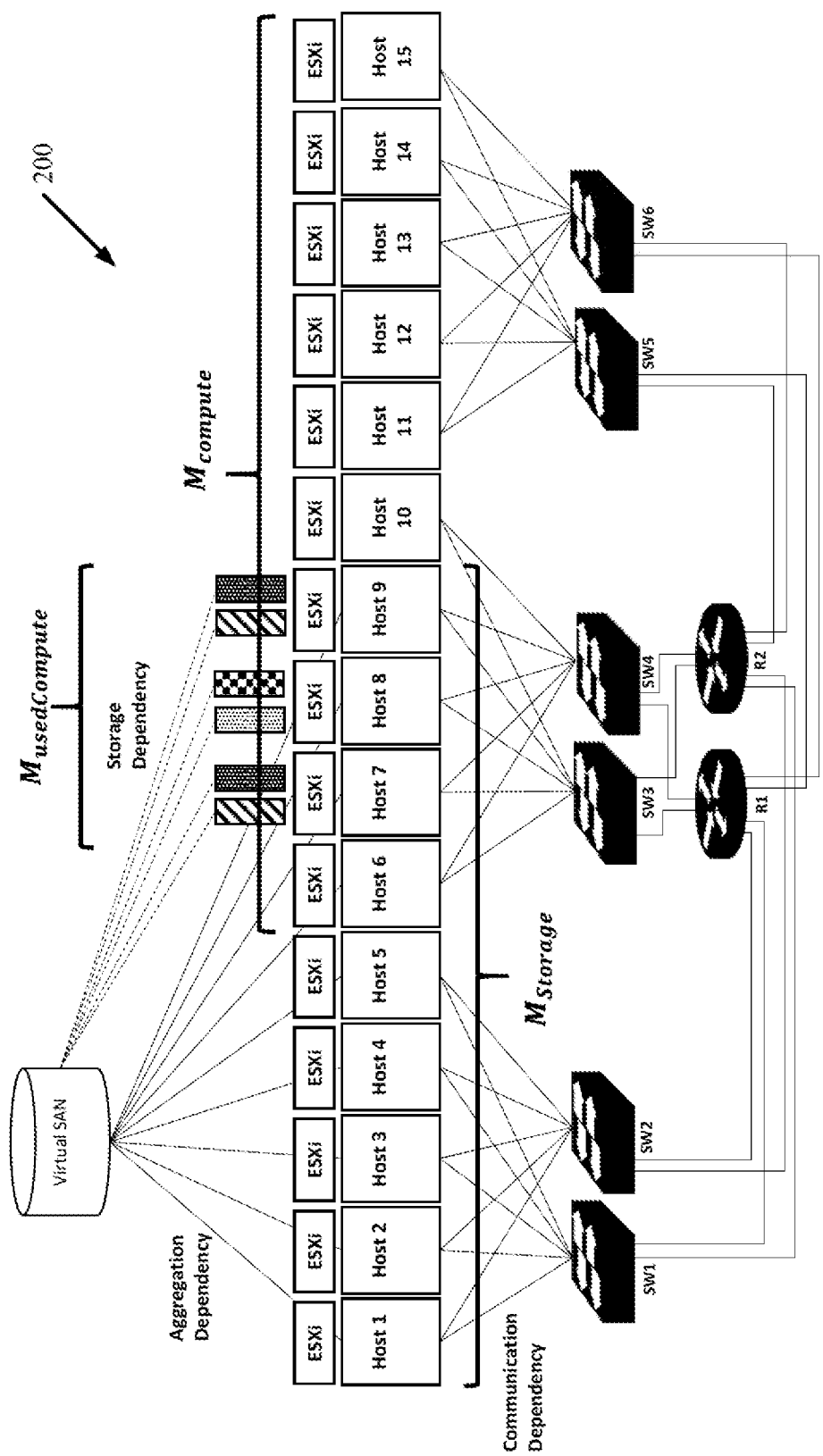
FIG. 2 shows an illustrative example of an IaaS system according to one embodiment.

FIG. 2 shows an illustrative example of an IaaS system 200 with 15 hosts. Nine of these hosts participate in the creation of a VMware Virtual Storage Area Network (VSAN)—the storage infrastructure supporting VM operations in the system ($|M_{storage}|=9$), while 10 of the hosts provide compute services ($|M_{compute}|=10$). Thus, host 6 through host 9 belong to both sets. In this example it is assumed that each host in $M_{compute}$ has a capacity to serve two VMs (K=2). In addition to these resources, there are dedicated network resources: switches and routers shown at the bottom of the figure. The example assumes four tenants each with their scaling policy. Note that for this example, the controller hosts are not shown in FIG. 2.

Considering the illustrative example of FIG. 2, an administrator may issue an upgrade request with two changes: (1) to upgrade the virtual shared storage from VSAN to Ceph; and (2) to upgrade the networking infrastructure from IPv4 to IPv6. These changes of the virtual shared storage and the networking infrastructure are independent of each other, therefore the administrator separates them into two change sets. For each set, the complementary changes are inferred automatically from the infrastructure component descriptions provided by the infrastructure vendors. For example, the second change implies the upgrade of all routers, switches and hosts to IPv6. These are added as complementary changes to the second change set given in the upgrade request.

To collect all the information that may be necessary for upgrading resources and performing undo operations in the IaaS system, a Resource Upgrade Catalog is defined. This catalog includes all the infrastructure component descriptions provided by the different vendors for all the components already deployed in the IaaS system and the products (a.k.a. resources) to be added to the system. Accordingly, whenever a new upgrade request referring to a new product as a target version of a change is specified by an administrator, the product and its accompanying infrastructure component descriptions need to be added to the upgrade resource catalog.

In the illustrative example, the resource upgrade catalog includes the infrastructure component descriptions for both VSAN and Ceph. Using these infrastructure component descriptions, the scripts for upgrading the virtual shared storage from VSAN to Ceph can be derived. The same applies also for downgrading it from Ceph to VSAN if an undo become necessary.

To coordinate the upgrade process and to create the runtime upgrade schedule(s) for each iteration, the upgrade coordinator needs to be aware of the configuration of the system as well as the status of the ongoing upgrade. For this purpose, the Resource Graph (RG) is defined. It maintains the state of the upgrade process with respect to IaaS resources and their dependencies.

The RG is a directed graph (R, D), where R is the set of vertices and D is the set of edges. The vertices represent the resources in the system (existing or to be added). A vertex (resource) is characterized by the following attributes:

Resource/id: It is the id of the resource. For a resource to be added to the system, an id is generated when the resource is added to the RG.

Resource-kind: It is the kind of the resource (e.g. compute host, switch, router, etc.) in the infrastructure resource models.

Modification-type: It indicates whether the resource is to be upgraded, added, or removed by the requested change, or it remains unchanged. It can have the values of "Upgrade", "Add", "Remove", or "No-change". As the upgrade proceeds, the value of this parameter is updated to reflect the first one among the remaining changes to be applied to the resource.

Activation-status: It indicates the activation status of the resource, which may be active (i.e. in service) or deactivated (i.e. out of service).

Undo-unit-ids: It indicates the set of undo units the resource belongs to. Since there may be several change sets impacting the same resource, each resource may be associated with several undo units.

Actions-to-execute: It is an ordered list of execution-levels where each execution-level is an ordered list of upgrade actions to be executed on the resource. Thus, two levels of ordering are defined for upgrade actions, within an execution-level and between execution-levels.

Number-of-failed-upgrade-attempts: It is the counter of the failed upgrade attempts for the resource per undo unit.

Related-resource: indicates the relation between a new and a current resource in the RG, where the new resource is replacing the old one. Note that this parameter is only used to control the process of PPU, where both configurations of a VM supporting infrastructure resource are kept for the time of its upgrade to maintain the continuity of its service. The related resource of the old resource will be the new resource, and vice versa.

Is-isolated: indicates whether the resource is isolated or not.

Is-faded: indicates whether the resource is failed or not.

D is a set of edges, each representing a dependency between resources, either in the current or in the future configuration. The edges can be of different types to capture the different types of dependencies defined for the IaaS system: container/contained dependency, migration dependency, composition dependency, aggregation dependency, communication dependency, storage dependency controller dependency, VM supporting infrastructure dependency, and peer dependency between resources.

An edge $d_{ij}$ denotes a dependency of resource $R_i$ on resource Rj, i.e. it is directed from the dependent to the sponsor resource. A symmetrical dependency (peer) is represented by a pair of edges between two resources, i.e. $d_{ij}$ and $d_{ji}$. Each edge has two parameters:

Presence: it indicates whether a dependency exists in the current configuration, in the future configuration, or in both. It is used to properly handle the requirements of existing and future dependencies in the system. It can hold the values of "future", "current", or "current/future".

IncompatibilityFactor: it indicates an incompatibility along the dependency, which needs to be resolved during the upgrade. Note that an incompatibility can only occur along a dependency with a presence value of "current/future". It is used to identify the upgrade units. It can hold the values "true" or "false".

Figure 3:
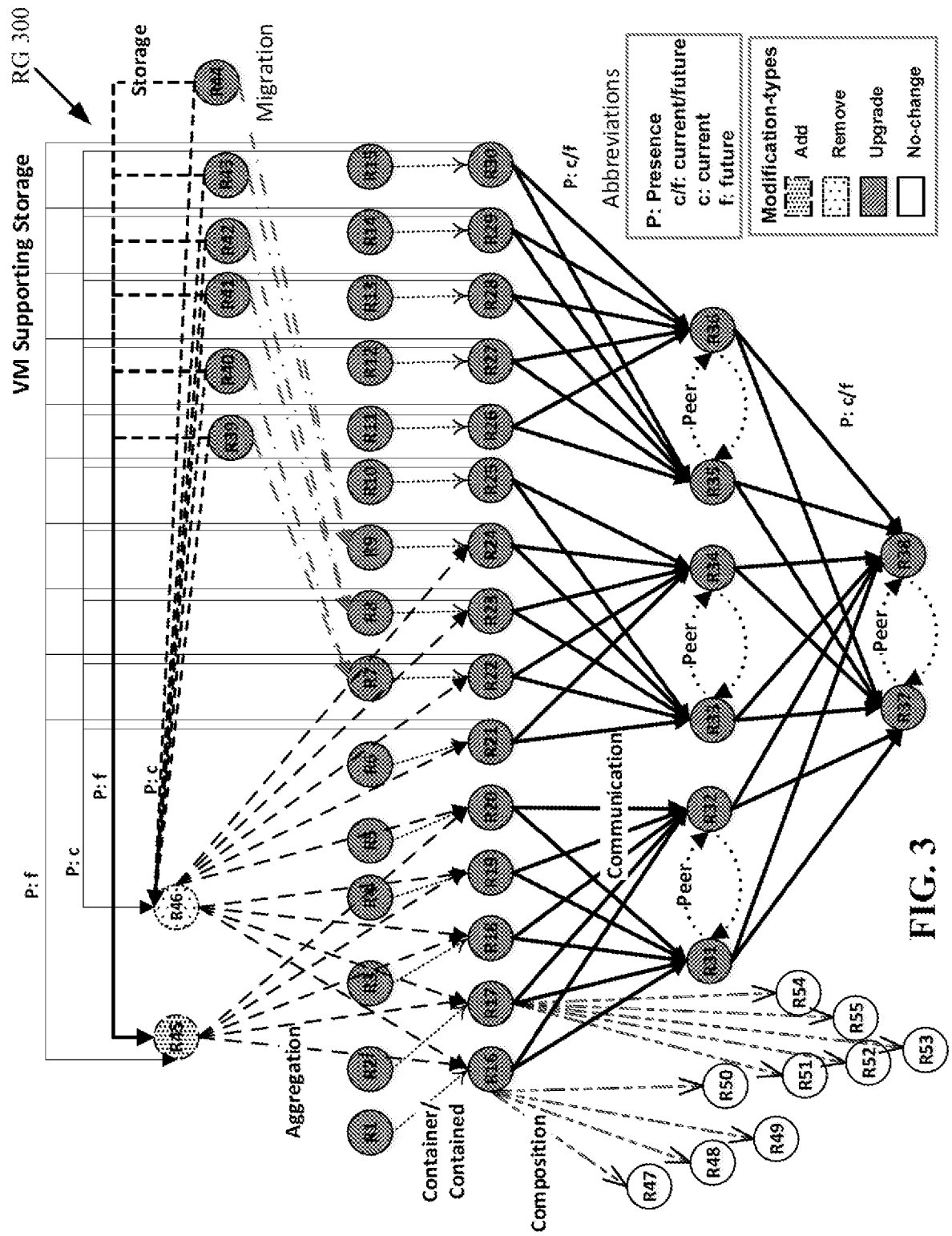
FIG. 3 shows an example resource graph reflecting the system of the illustrative example of FIG. 2 after an upgrade request was received according to one embodiment.

FIG. 3 shows an example RG 300 reflecting the system of the illustrative example of FIG. 2, after the upgrade request was received according to one embodiment. In RG 300, for example, vertices of R1 to R15 represent the hypervisors running on host1 to host15 represented by vertices R16 to R30. This hosting relation (i.e. container/contained dependency) is represented by the edges between the vertices e.g. R1 and R16. For readability in this graph only part of the configuration of the system and the modification-types for the requested upgrade are represented.

A product (e.g. Ceph) delivered by a vendor may be mapped to one or more IaaS resources. This example aims to upgrade the existing VSAN virtual shared storage (represented by R46) to Ceph (represented by R45), which are both compound products delivered and described by their vendors. In the current configuration, storage hosts R16 to R24 are aggregated into the virtual shared storage of R46, while in the future configuration R16 to R20 will be aggregated into R45. R46 serves as a VM supporting storage to the compute hosts R21 to R30 and needs to be replaced by R45. The resources for the current configuration are mapped to the VSAN product and its infrastructure components, while those for the future configuration are mapped to the Ceph product and its components.

Since the virtual shared storage is an infrastructure resource supporting VM operations, and since the VSAN cannot be upgraded to Ceph in place due to incompatibilities, the PPU method is used for the upgrade. Whenever a resource cannot be upgraded in place due to incompatibilities, two vertices are used for representing the resource, one for the old configuration with modification-type of remove (e.g. R46), and one for the new configuration with modification-type of add (e.g. R45). To deploy the Ceph product in the IaaS system the mapping of the IaaS resources is identified based on the requested change, the RG and the requirements indicated in the Ceph component descriptions. The different components of the new Ceph product will be mapped to the storage hosts (represented by R16 to R20), the compute hosts (represented by R21 to R30), and to the new shared storage (represented by R45). After a successful mapping any additional changes required for consistency will be derived and added to the change set. Otherwise the change set cannot be applied and marked as failed.

As mentioned previously in this disclosure, an upgrade unit identifies a group of resources that have to be upgraded using an appropriate upgrade method to handle the potential incompatibilities during the transition between the current and future configuration. Each upgrade unit may include several resources with different dependencies. According to the types of existing dependencies on which incompatibility issues may arise, a specific upgrade method is selected to prevent communication between resources of the incompatible versions. For this purpose, upgrade method templates are defined as follow.

The split mode is used to avoid incompatibilities along certain dependencies when the resources in an upgrade unit have possible incompatibilities along peer dependency and/ or along sponsorship dependency (except communication dependency). In both situations following two conditions have to be valid: 1) there are no incompatibilities along communication dependencies in the whole upgrade unit, and 2) there are no more than two constituent resources participating in an aggregation dependency in the whole upgrade unit. Otherwise, other upgrade methods have to be used depending on the situations.

In split mode, the resources of an upgrade unit are divided into two partitions which are upgraded one at a time. The order of deactivation and activation of the partitions is orchestrated to avoid incompatibilities by having only one of the partitions active at any given time until both partitions are upgraded.

The disclosed method minimizes the impact of the upgrade of resources in an upgrade unit by keeping at least half of the resources of the upgrade unit in service. To account for this, the following rules have to be valid for each partition while considering the other partition out of service: 1) the number of in-service resources in the partition has to be floor/ceiling of the half of the total number of in-service resources of the whole upgrade unit, and 2) at least one resource out of each peer resources (direct or indirect) remains in service in the partition. Note that since aggregate resources (i.e. constituents) are considered peer resources, there can only be one aggregate resource in each partition.

Figure 6A:
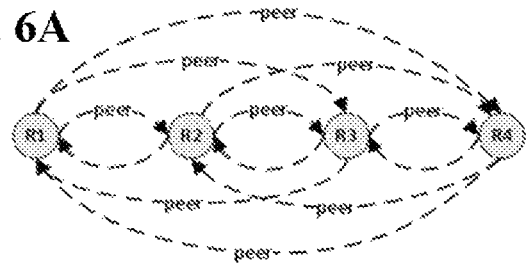
FIGS. 6A, 6B, 6C and 6D illustrate examples of resource partitioning for upgrade units with the split mode.

Examples of resource partitioning for upgrade units with split mode are provided in connection with FIGS. 6A-6D. In FIG. 6A, the upgrade unit includes four peer resources (R1, R2, R3, and R4) with possible incompatibilities along the peer dependencies. According to the aforementioned partitioning rules for split mode, each partition will include at least two out of four resources. One possible partitioning for this upgrade unit is to have R1 and R2 in partition 1, and R3 and R4 in partition 2.

Figure 6B:
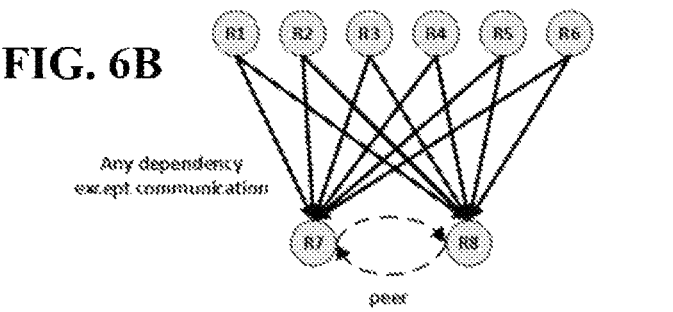

In FIG. 6B, the upgrade unit includes two peer resources (R7 and R8), with six sponsorship dependent resources (R1, R2, R3, R4, R5, and R6) with possible incompatibilities along all dependencies. Note that, the sponsorship dependencies are any subcategories of sponsorship dependency except communication dependency. In this example, each partition has to include one of the peer resources of R7 and R8, and floor/ceiling of the half of the number of dependent resources (i.e. three dependent resources). Since there are no peer dependencies between dependent resources, a different combination of dependent resources can be in each partition, as long as it includes the floor/ceiling of the half of the number of dependent resources.

Figure 6C:
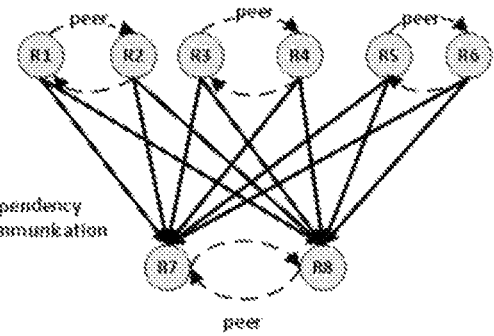
Figure 6D:
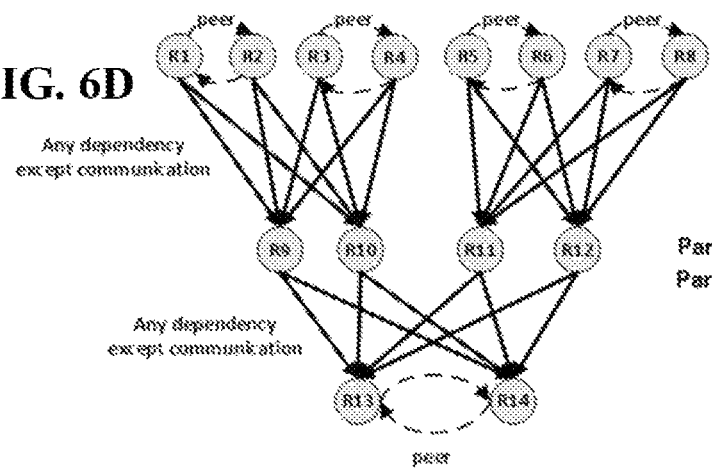

In FIG. 6C, the upgrade unit includes similar resources as of example b, with the difference of having peer dependencies between some of sponsorship dependent resources. It is to be avoided that peer resources are in the same partition. So, the partitioning of example b is not valid for this example. One of the possible partitionings will be grouping of R7, R1, R3, and R5 into partition 1, and grouping of R8, R2, R4, and R6 into partition 2. The upgrade unit may include two levels of sponsorship dependencies (any type except communication dependency) with possible incompatibilities along them, as shown in FIG. 6D. To keep at least half of the resources of the upgrade unit in service and to maintain the availability of the services provided by the peer resources, each partition will include one of the independent sponsor resources (R13 and R14) and half of their direct and indirect dependent resources (R1 to R12), while considering the constraints of peer dependencies between resources.

The steps of the split mode are as follow: 1) Take the first partition out of service (i.e. deactivating) and upgrade it. 2) Take the second partition out of service (i.e. deactivating the second partition) and put back the first partition in service (i.e. activating the first partition). Then, upgrade the second partition, and put it back in service.

The modified split mode is used when there are resources with possible incompatibilities along communication dependencies in an upgrade unit, and there are no more than two constituent resources participating in an aggregation dependency in the whole upgrade unit.

The modified split mode method implements the split mode upgrade with some modifications in the partitioning of resources, and activation/deactivation of them.

As mentioned earlier, the split mode can be used for handling possible incompatibilities along most sponsorship dependencies, except communication dependencies. When there are incompatibilities along communication dependencies, the application of the split mode is problematic. In the partitioning of the split mode, communication dependent resources, as well as others, will be divided between two partitions to keep at least half of the resources of the upgrade unit in service. The problem arises when applying the second step of split mode, when the old version of the communication dependent resource(s) have to be upgraded at the same time as the remaining old version communication sponsor(s) of the second partition. The old version communication dependent resource(s) will not be reachable from the sponsor(s) of the new version (due to incompatibilities) nor from the remaining sponsor(s) with the old versions (due to their presence in the same partition, which is deactivated). Indeed, this is caused by the difference of communication dependency and other subcategories of sponsorship dependencies; the communication dependency realizes the physical or virtual link between resources and the dependent resources may lose the connectivity to the network without the sponsor resource. To resolve the problem while addressing the possible incompatibilities along this type of dependency, the second partition (to be upgraded in step 2 of the split mode) is split into two or more partitions depending on the existing levels of communication dependencies (with possible incompatibilities along) in that partition. When there are possible incompatibilities along communication dependency, the communication dependent and sponsor resources have to be in separate partitions. Similar to split mode, at least one resource out of each set of peer resources have to be in a separate partition. Note that the first partition will be the same as the first partition in the split mode. There is no need to split the first partition, since the communication dependent resources of the first partition are reachable during the upgrade of the first partition from any communication sponsors of the old version residing in the other (still active) partition.

FIGS. 7A-7D illustrate examples of resource partitioning for upgrade units with modified split mode. In the example upgrade units, it is assumed that there are incompatibilities along the communication dependencies and there are no more than two constituent resources in each upgrade unit; thus, the modified split mode is to be used.

In FIG. 7A the upgrade unit includes two peer resources (R7 and R8), with six communication dependent resources (R1, R2, R3, R4, R5, and R6) with possible incompatibilities along all dependencies. Since the upgrade unit includes one level of communication dependencies, the resources will be divided into three partitions. One of the possible partitionings is to group R7, R1, R2, and R3 into partition 1, group R4, R5 and R6 into partition 2, and have R8 in partition 3. Note that in partition 1, the communication dependent resources (R1, R2, and R3) can be grouped and upgraded in the same partition as one of their communication sponsors (R7), since they can be reached through their other communication sponsor (R8) at the time of upgrade.

The example in FIG. 7B is similar to the example in FIG. 7A, with the difference of having peer dependencies between some of communication dependent resources. It is to be avoided that peer resources are in the same partition. Thus, the partitioning of example FIG. 7A is not valid for this example. One of the possible partitionings is to group R7, R1, R3, and R5 into partition 1, group R2, R4, and R6 into partition 2, and have R8 in partition 3.

In FIG. 7C, the upgrade unit includes two levels of communication dependencies with possible incompatibilities along them. Thus, the resources will be divided into four partitions having the communication dependent and sponsor resources in separate partitions, expect for partition 1. Note the partitioning constraints of peer resources need to be taken into account. One of the possible partitioning will be as follow: partition 1 including one of the independent sponsor resources (R13) and half of their direct and indirect dependent resources (R9, R11, R1, R3, R5 and R7), partition 2 including the remaining indirect communication dependent resources (R2, R4, R6 and R8), partition 3 including the remaining direct communication dependent resources, which are also sponsors of partition 2 (R10 and R12), and partition 4 including the remaining direct communication sponsors of partition 3 (R14).

In the example of FIG. 7D, the upgrade unit includes several levels of sponsorship dependencies. In contrary to the example c, there is only one level of communication dependency in the upgrade unit, while the other level is any subcategory of sponsorship dependency except communication. Thus, the resources will be divided into three partitions. One of the possible partitionings is to group R13, R9, R11, R1, R3, R5 and R7 into partition 1, group R2, R4, R6, R10 and R12 into partition 2, and have R14 in partition 3. Note that R2, R4, R6, and R8 can be in the same partition as R10 and R12, since there are no communication dependencies between these two sets of resources. However, R10 and R12 have to be in the separate partition from R14, since communication dependent resources cannot be in the same partition as their communication sponsors, except for partition 1.

The partitions are upgraded according to their numbers; the first partition (i.e. partition 1) will be upgraded first and then the partition with indirect communication dependent resources of the old version (i.e. partition 2) will be upgraded next. The upgrade process will continue by upgrading the partition including the communication sponsors of the previous partition, until reaching the last partition including the independent communication sponsor resources.

In addition to the different resource partitioning in the modified split mode, the prerequisite actions for handling incompatibilities during the upgrade of each partition differs from the split mode. The modified split mode can be applied in two different ways based on the availability of remote link management in the system (i.e. enabling/disabling the link).

First, the modified split mode without remote link management is described. When remote management on the communication links is not available, resources of incompatible versions are deactivated or activated such that it prevents incompatibilities. After upgrading each partition, the resources of the partitions will remain deactivated as long as there is any active resource of the old version, i.e. until starting the upgrade of the last partition (which includes the remaining communication sponsor resources of the old version). As soon as the last partition is taken out of service all the previously upgraded partitions are put back in service. Thus, an upgrade unit will have a complete outage while applying the modified split mode without remote link management. Thus, to maintain availability additional resources have to be used to compensate for the impact of such an upgrade.

Second, the modified split mode with remote link management is described. When remote management on the communication links is available, each communication link between resources of incompatible versions is deactivated or activated during the upgrade of partitions to prevent the possible incompatibilities. Before upgrading a partition, the system disables the communication links between the resources being upgraded in the current partition with their communication dependent resources in the other partitions. After upgrading a partition and before putting it back in service, the system disables the communication links between the upgraded resources (i.e. new version) of the partition with their communication sponsor resources (i.e. old version) in the other partitions. Subsequently, the communication links of the upgraded resources towards other upgraded partition is enabled, before enabling the upgraded resources.

The modified split mode with multiple constituent resources is used when there are incompatibilities along peer or sponsorship dependencies; however, split mode or modified split mode cannot be used due to the existence in the upgrade unit of more than two constituent resources participating in an aggregation dependency. Since there is a restriction to take no more than one constituent resource out of service at a time, no more than one constituent resource can stay in the same partition, hence the same partitioning cannot be applied. In the modified split mode with multiple constituent resources, the resources are grouped into partitions similar to modified split mode, except for the constituent resources. Each constituent resource will be in a separate partition.

The upgrade order of the partitions is similar to the modified split mode, but partitions with constituent resource are upgraded one at a time. Depending on the availability of remote link management, incompatibilities will be avoided by enabling/disabling either the resources themselves or the communication links between them.

In the rolling upgrade, the system is partitioned into subsystems, one of which is upgraded at a time while the others provide the services. The rolling upgrade method may be used when there are no incompatibilities. Since the resources are grouped into upgrade units based on the incompatibilities along their dependencies, the resources without incompatibilities along their dependencies will be in separate upgrade units.

In other words, such an upgrade unit includes a single resource to be upgraded using the rolling upgrade method. Note that in a given iteration, depending on the current state of the system, the grouping in the CG and the SLA constraints for availability and elasticity, multiple upgrade units with rolling upgrade method can be selected for the upgrade at the same time. For example, if container and contained resources are merged into a single vertex of the CG and this vertex of the CG is selected for a rolling upgrade, all upgrade units containing the resources merged into the vertex are selected at the same time.

All of the aforementioned upgrade methods handling possible incompatibilities, except the modified split mode with remote link management, prevent the incompatibilities by keeping the resources of each partition deactivated after the upgrade. This results in service degradation or service outage for the upgrade units. The split mode reduces the service capacity of the upgrade unit to its half, while modified split mode without link management (including modified split mode with multiple constituent resources) results in the outage of upgrade unit for the duration of the upgrade. On the one hand, additional resources are required as a prerequisite for supporting the upgrade methods handling incompatibilities. On the other hand, the amount of required additional resources has to be minimized to reduce the cost of the upgrade. It is assumed that there are some additional resources in the system dedicated to be used for handling incompatibilities.

The minimum number of such additional resources can be determined based on the existing upgrade units of the system and considering the amount of service degradation (in terms of compute hosts) of the applicable upgrade method. To determine this minimum number, the upgrade unit with the maximum service degradation in terms of compute hosts is identified. This amount of compute hosts is used as the minimum required additional resources dedicated for handling incompatibilities throughout all the upgrades in the system. Thus, the upgrade of some of the upgrade units may be delayed due to the limitation of available extra resources.

Figure 4:
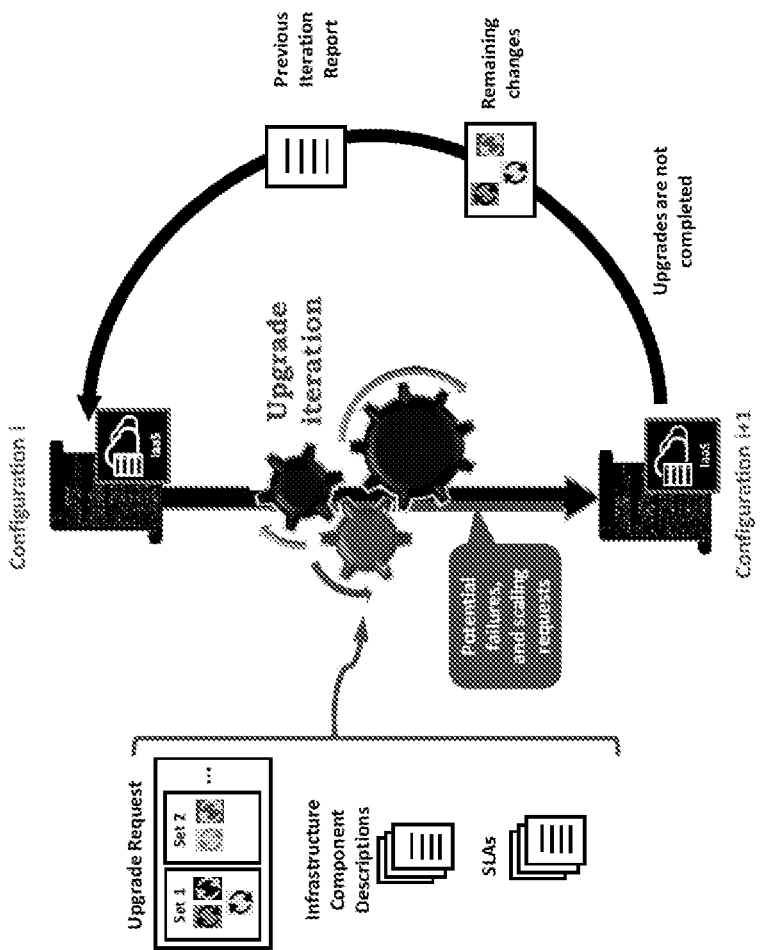
FIG. 4 illustrates an overall view of an iterative process of an upgrade method according to one embodiment.

The following is a detailed description of the proposed IaaS upgrade method. To maintain availability the IaaS cloud system has to be upgraded using an iterative process. FIG. 4 illustrates an overall view of an iterative process of the upgrade method according to one embodiment. In each iteration, a current configuration (configuration i) is upgraded to an upgraded configuration (configuration i+1), taking the upgrade request, the infrastructure component descriptions and the SLAs as input. The previous iteration reports, if any, is also taken into account. The upgrade process handles potential failures and scaling requests. The iterative process continues if there are any remaining changes to be handled.

Figure 5:
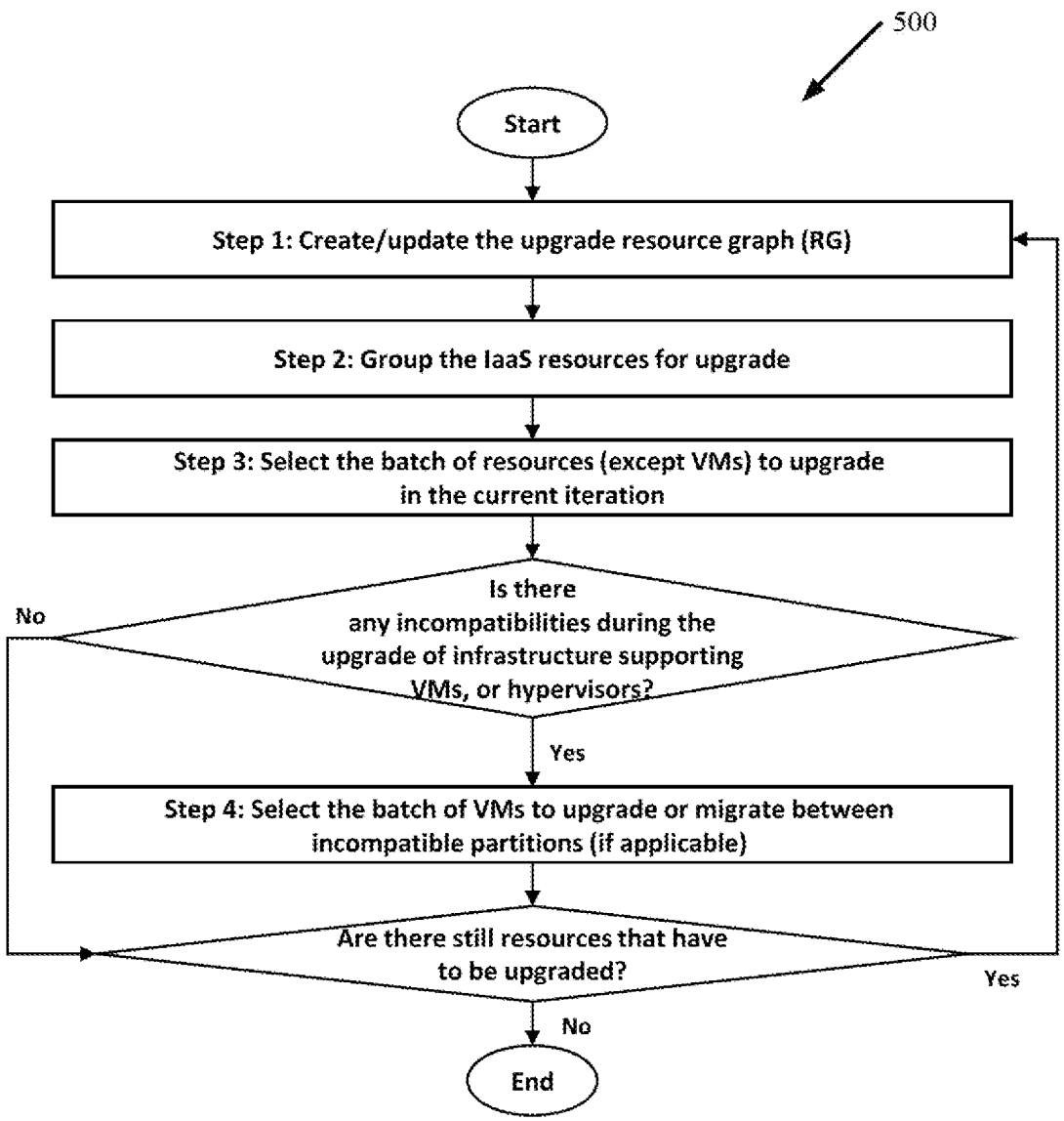
FIG. 5 is a flow diagram illustrating the main steps of the iterative process of FIG. 4 according to one embodiment.

FIG. 5 is a flow diagram illustrating the main steps in each iteration of an iterative process 500 according to one embodiment. The four main steps include: step 1 to create/update the resource graph (RG); step 2 to group the IaaS resources for an upgrade; step 3 to select the batch of IaaS resources for the upgrade, and step 4 to select the batch of VMs for migration.

In each iteration, step 1 collects and organizes the information necessary for the upgrade of the IaaS resources by creating or updating the RG. This graph is created in the initial iteration and then updated in each subsequent one. The inputs for this step in the initial and in the subsequent iterations, while similar, are not the same. In the initial iteration, the RG is created according to the current configuration of the system, the requested change sets, and the infrastructure component descriptions provided by vendors. In a subsequent iteration, as additional inputs the upgrade request model is used reflecting the new and ongoing upgrade requests and the upgrade iteration report with the results of the previous iteration. Among others, the upgrade iteration report indicates any failed upgrade actions of the previous iteration together with the failed and isolated-only resources, based on which undo/retry operations can be initiated as necessary.

As mentioned earlier, the configuration of the system may also change between two subsequent iterations independent of the upgrade process, for example, due to live migrations, failures, and scaling in/out. Thus, in each iteration the RG is updated to reflect the current configuration of the system. The RG update also takes into account any new upgrade request for which complementary changes and appropriate upgrade methods are identified.

In step 2, from the RG, the resources that need to be upgraded at the same time are identified based on their dependencies and the selected upgrade methods. The vertices of these resources are merged and by that the RG is coarsened into an upgrade Control Graph (CG), where each vertex represents a resource group grouping one or more resources that need to be upgraded at the same time. A vertex of the CG maintains all the information of the vertices of the RG from which it was formed. For example, for the resource groups the actions-to-execute attribute is formed by merging per execution level the actions-to-execute attributes of the resources forming the group. In the subsequent steps, the resources that can be upgraded in the current iteration are selected according to the resource groups of the CG and their dependencies.

Thus, in step 3, first the IaaS resource groups that can be upgraded without violating any of their dependency compatibility requirements are selected to form an initial batch. However, because of SLA constraints maybe only a subset of the initial batch can be upgraded in the iteration resulting in a final batch. Accordingly, a runtime upgrade schedule is generated consisting of the upgrade actions for the final batch. This upgrade schedule is sent to the upgrade engine for execution, which reports back the results. In case of a failure of an upgrade action, a new schedule may be generated right away to try to bring back the affected resources into a stable configuration using the undo actions of the upgrade actions already executed in the current iteration. It is noted that only upgrade actions of the same undo unit are relevant. If actions of more than one undo units have been executed, it may not be necessary to undo the actions of other undo units. For example, if uu1 and uu2 are two different undo units and upgrade actions a1(uu1), a2(uu1), a3(uu2), a4(uu2) were successfully executed on the resource and a5(uu2) failed, then it is sufficient to undo only a3 and a4 as they are associated with the same undo unit uu2. Upgrade actions a1 and a2 can remain applied. This, however, may be determined by policies whether such partial undo of an execution-level is acceptable.

In step 4, the VMs hosted by the infrastructure are considered. Whenever during the upgrade the compute hosts have been partitioned, if appropriate, a batch of VMs is selected in this step for migration and possibly upgrade. Since the upgrade of both the VM supporting infrastructure resource and the hypervisor affect the compute hosts on which the VMs are hosted, while they are upgraded the IaaS compute hosts are partitioned into an old and a new partitions. If these upgrades do not necessitate VM upgrade, in step 4 a selected batch of VMs is migrated from the old partition to the new one. If VM upgrade is also necessary due to incompatibilities between the versions, then the VMs are also upgraded in the process. The selection of the batch of VMs takes into account the results of the previous step 3, i.e. the outcome of the execution of those upgrade schedule(s). To respect application level redundancy, the disclosed method may impact at a time only a limited number of VMs per anti-affinity group (one or as appropriate for the SLA). This means that the selected batch of VMs may need to be upgraded/migrated in sub-iterations. Thus, the upgrade coordinator generates an upgrade schedule for each sub-iteration. As in step 3, the upgrade coordinator sends each schedule to the upgrade engine for execution and based on feedback received generates the next schedule. If an upgrade action fails, the new upgrade schedule also includes the actions reversing the effects of completed upgrade actions for the failed action. The process continues until all the VMs in the selected batch have been handled. If the compute hosts are not partitioned, step 4 is skipped altogether.

Referring back to the upgrade coordinator 110 and the upgrade engine 120 of FIG. 1, in each iteration, the upgrade coordinator 110 generates several upgrade schedules. After the execution of each schedule, the upgrade engine 120 reports back to the upgrade coordinator 110 the results. At the resource level any failure is handled right away by the upgrade coordinator 110 by generating a new schedule to bring the resource into a stable configuration or to isolate it. Once resource level actions are not appropriate or necessary for the given iteration, the upgrade coordinator 110 updates the upgrade request model, the RG and the CG, and generates the upgrade iteration report to reflect the execution result of all schedules within that iteration. Then the upgrade coordinator 110 proceeds to the next iteration as appropriate.

The upgrade process terminates when all upgrade requests indicated in the upgrade request model have been handled and no new upgrade request has been received. This means that all change sets of all the upgrade requests received have been applied successfully or undone unless their target resources failed.

Each of the four steps in FIG. 5 is further elaborated below.

Figure 9A:
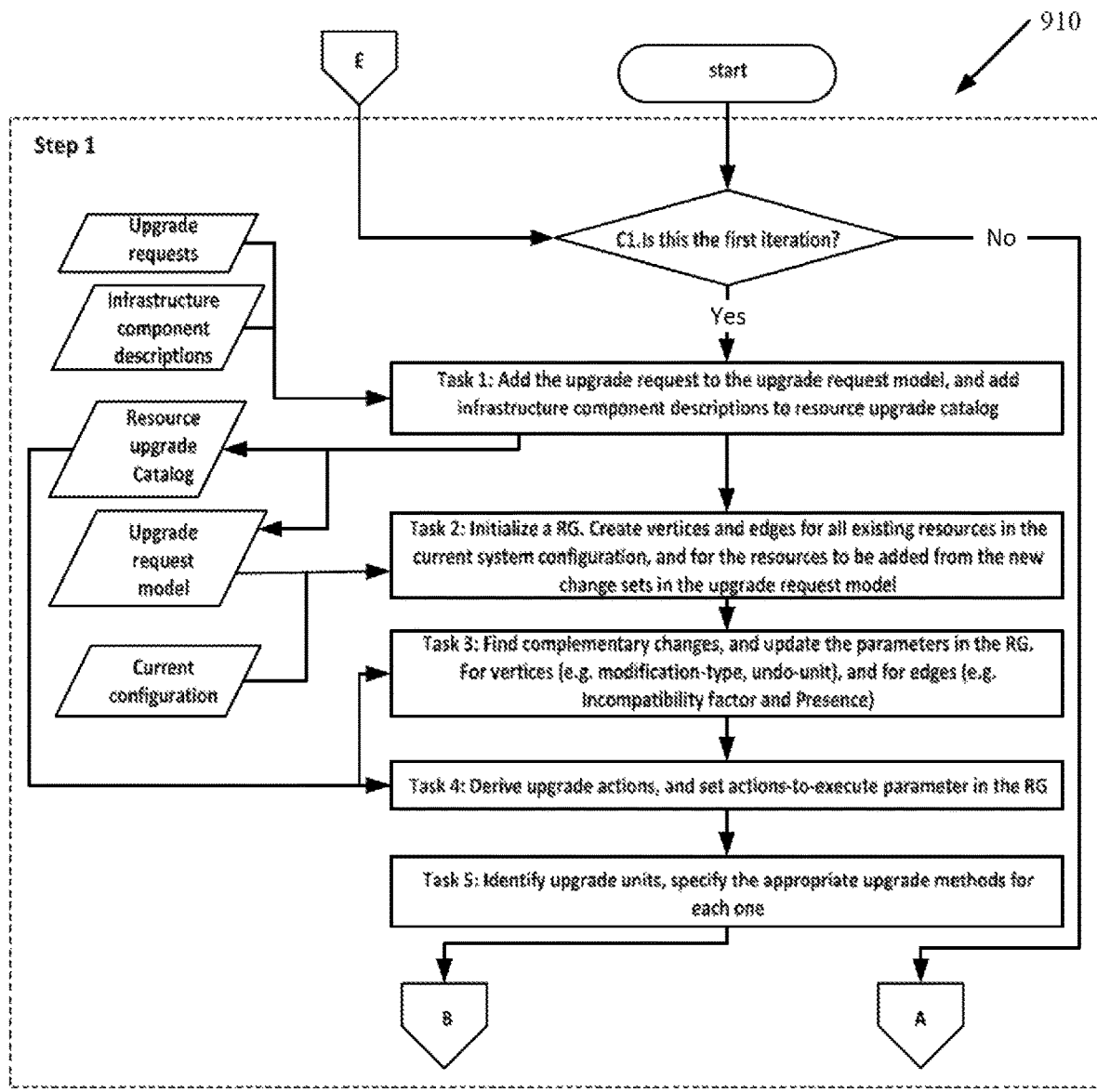
FIGS. 9A, 9B, 9C and 9D illustrate details of the iterative process of FIG. 5 according to one embodiment.
Figure 9B:
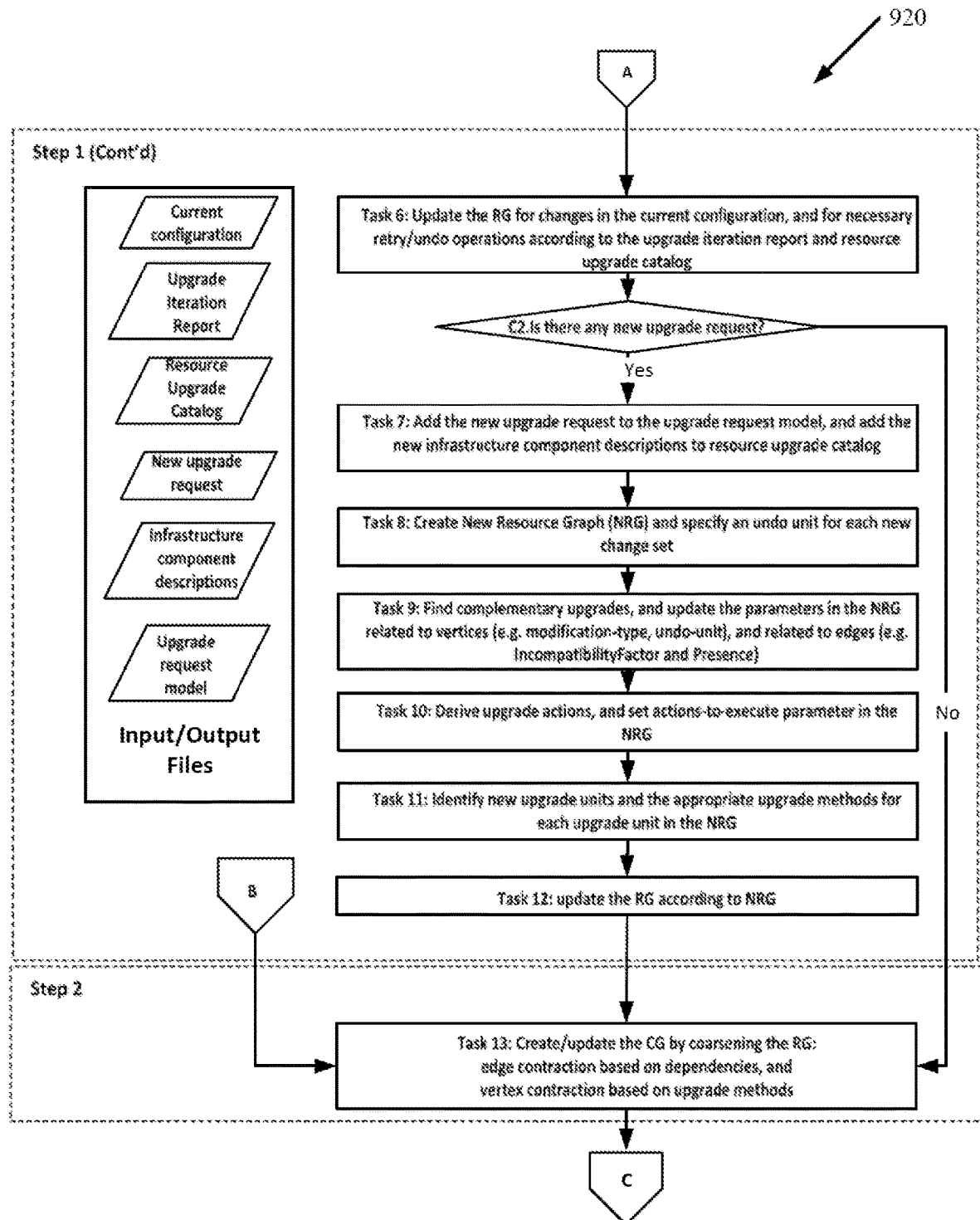

Step 1: Creating/updating the resource graph. The tasks for creating/updating the RG in this step are indicated from Tasks 1 to 12 in flow diagrams 910 and 920 of FIG. 9A and FIG. 9B.

As mentioned earlier, the upgrade requests received from the administrator are processed and aggregated into the upgrade request model, which is used as input to create and update the RG.

For creating the RG, all existing resources (i.e. vertices) and dependencies (i.e. edges) are extracted from the current configuration of the system. Their parameters are derived from the system configuration (e.g. resource-id) and the upgrade request model (e.g. modification-type). The resources to be added are determined from the change sets in the upgrade request model. For them the parameters and dependencies are derived from the upgrade request model and from the infrastructure component descriptions provided by the vendor.

For example, whenever the VM supporting infrastructure resources cannot be upgraded in place and PPU is used, in the RG two vertices are created to represent the old and the new configurations of the VM supporting infrastructure. Their modification-type is set respectively to remove and to add. Thus, the old configuration of the VM supporting infrastructure resource(s) will be replaced by the new one as a result of the upgrade.

To satisfy the requirements indicated by the vendors, each change set is verified for completeness and any missing changes are added to the upgrade request model. These are also reflected in the RG. In this process each change set is assigned to a unique undo unit.

The actions-to-execute attribute of each resource is determined using the infrastructure component descriptions kept in the upgrade resource catalog. If the required upgrade actions cannot be applied to a resource in a single iteration due to ordering constraints, the upgrade actions are split into different execution levels to enforce the ordering.

To avoid the communication between resources of incompatible versions during their upgrade, the upgrade of dependent resources with incompatibilities need to be carried out using an upgrade method, which handles appropriately these incompatibilities. For this, the disclosed method first identifies such resources in the RG and then groups them into an upgrade unit with which an appropriate upgrade method is associated. The two basic upgrade methods used are: split mode and rolling upgrade. The split mode is typically used in case of incompatibilities and rolling upgrade otherwise. The split mode upgrade method has different variants as discussed earlier. In addition, the PPU method can be considered as one of its variants. Other upgrade methods may be used as well depending on the situations, but not addressed in this disclosure.

To update the RG in a subsequent iteration, first the current configuration of the system is reflected in the RG for any changes that occurred in the system. The upgrade iteration report of the just-completed iteration helps in identifying any retry and system level undo operations needed. A retry operation is initiated on a resource with a failed upgrade attempt if the number of failed upgrade attempts is less than the retry thresholds of the related undo unit. The actions-to-execute attribute is adjusted as required. Otherwise, the resource is isolated. Whenever, the number of isolated-only and failed resources for an undo unit reaches the undo threshold, all the changes already applied to the resources of the undo unit has to be undone. In addition, an undo operation is initiated for any undo unit whose upgrade cannot be completed within the time limit indicated as max-completion-time. This is measured from the time of the time stamp of the upgrade request with the corresponding change set. The time stamp may reflect the time the upgrade request was received or the time when the first action associated with the upgrade request was applied. These undo units and the associated change sets are also marked as failed.

To apply an undo operation, the actions-to-execute attributes of all the affected resources (excluding the failed resources) in the failed undo unit are adjusted so that they will be taken to the undo version indicated for the resources. These undo actions are organized into the first execution level of the resources so that they will be executed first. Since these resources might have in their actions-to-execute attributes upgrade actions associated with other change sets requested on the resources, which were not completed yet and become inappropriate or incomplete with the adjustments due to the undo, they need to be adjusted as well. For this, the upgrade actions of other execution levels of the resources are re-evaluated with respect to the potentially new source and target versions as well as the upgrade actions are updated based on the component descriptions in the catalog. Isolated-only resources which are at the undo version are released from isolation, otherwise they become failed resources. For example, if the actions-to-execute of a resource has an upgrade action (e.g. action1) to change a resource from version1 to version3 with an undo version2 at execution level 1, another upgrade action (e.g. action2) was added at execution level 2, which assumed that the resource is at least at version2, and a third upgrade action (e.g. action3) at execution level 3, which assumed that the resource is at version3, then when action1 fails, action2 and action3 are revised. Since the undo version for action1 is version2, action2 remains valid as long as the resource is upgraded to version2 before it is applied. That is, in addition to adding the undo action of the failed action1, which should bring the resource back to version1, an additional action is added to change the resource's version to version2. These actions are added at execution level 1, so that they are completed before action2 is executed. Regarding action3 at execution level3, since the resource will be at version2 only as opposed to the expected version3, this action 3 needs to be removed from the actions-to-execute of this resource and all related changes need to be revised as well in the related undo unit. Alternatively, if possible, an action can be added to execution level 2 to upgrade the resource to version3, so that it completes before action3 is executed. Note that other adjustments are also possible and may be needed depending on the given situation.

As mentioned earlier, new upgrade requests are added to the upgrade request model and then to the RG also in step 1. New upgrade requests may be targeting resources that are part of pending change requests. Such new upgrade request may also result in new incompatibilities. To identify these, a graph similar to the RG is used: The New Request Graph (NRG). It is created only from the new upgrade requests without considering any ongoing upgrades. From the component descriptions, the upgrade actions for the new change sets are extracted and organized into execution levels as required. Next, the disclosed method identifies any newly introduced incompatibility and creates the corresponding new upgrade units associated with an appropriate upgrade method in the NRG. This NRG is used to update the RG as follows: With respect to the actions-to-execute attributes of resources already in the RG, the disclosed method creates and appends a new execution level for each execution level in the NRG. The newly added execution levels are associated with the upgrade units identified in the NRG. Once the RG is updated from it the NRG is discarded.

Figure 8:
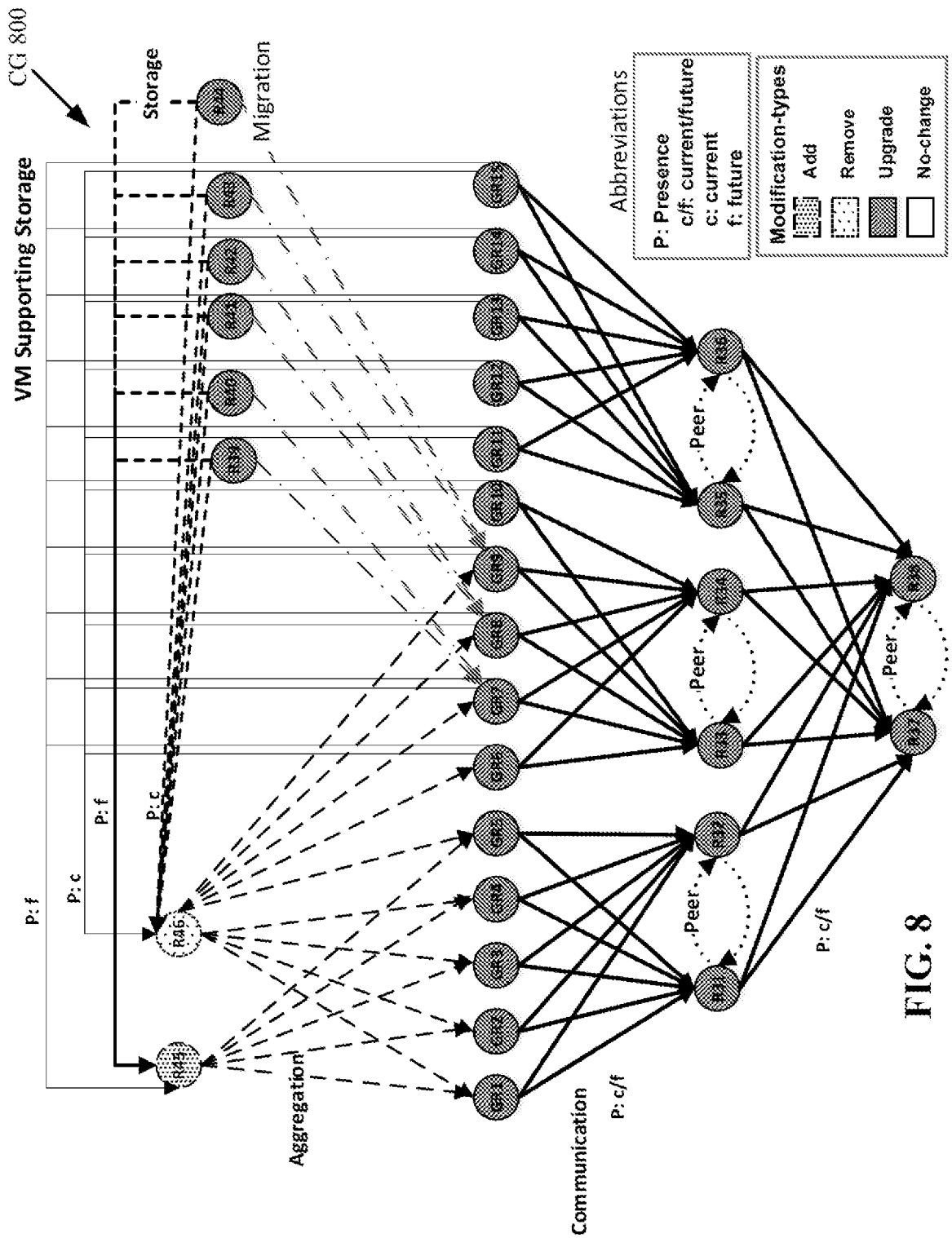
FIG. 8 shows a control graph corresponding to the resource graph of FIG. 3 for the illustrative example of FIG. 2 according to one embodiment.

Step 2: Grouping the IaaS resources for upgrade. Some dependency compatibility requirements between resources necessitate that they are upgraded at the same time in a single iteration. As mentioned earlier, to facilitate the coordination of the upgrade of these resources, the RG is coarsened into the CG, as indicated in Task 13 in flow diagram 920 of FIG. 9B. In the CG each vertex represents a resource group, i.e. an individual resource or a group of resources of the RG to be upgraded at the same time. Here more details are provided on the operations for creating or updating the CG:

A first type of operation is the dependency-based edge contraction. During the upgrade of a container its contained resource(s) experience an outage in addition to the outage during their own upgrade. Likewise, during the upgrade of constituent resources, their composite resource experiences an outage. To reduce the outage time, resources with container/contained and resources with composition dependencies are to be upgraded at the same time in a single iteration. Thus, the edges representing such dependencies in the RG are contracted to merge the vertices representing these resources into a single vertex of the CG. A vertex in the CG, representing a resource group of the RG, will have the same dependencies to other resources as the resources of the merged vertices of the RG except for the container/contained and the composition dependencies. FIG. 8 shows a CG 800 corresponding to the RG 300 of FIG. 3 for the illustrative example. An edge contraction of this type was applied to the vertices of the RG 300 representing the resources R1, R16, R47, R48, R49, and R50 to coarsen them into vertex GR1 of the CG 800. Note that in FIG. 8, the upgrade-related parameters of the CG are not shown.

A second type of operation is the upgrade method-based vertex contraction. Some upgrade methods avoid incompatibilities by upgrading resources at the same time in a single iteration. The disclosed method performs vertex contraction for such resources based on the associated upgrade methods of the first execution-level in their actions-to-execute attribute. In case of a vertex contraction, the resulting vertex of the CG will have the union of all dependencies that the resources of the group had in the RG. For example, the vertices representing the resources of an upgrade unit to be upgraded using the split mode upgrade method, will be contracted according to the sub-partitioning of the upgrade unit for the split mode. This allows the proper coordination of the upgrade of the resources without introducing incompatibilities.

In subsequent iterations, the CG is also updated to maintain consistency with the RG updated in step 1.

Figure 9C:
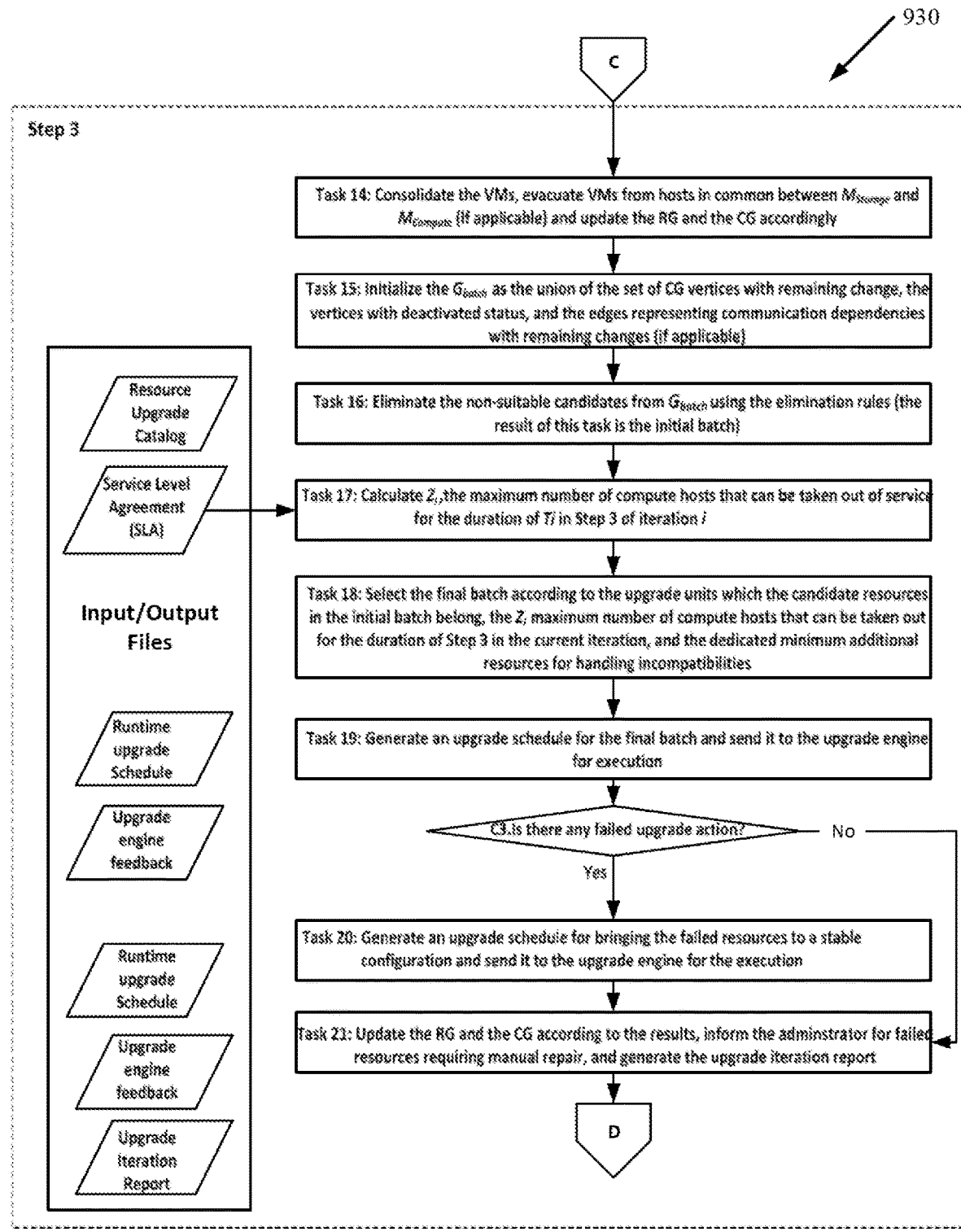

Step 3: Selecting the batch of IaaS resources for upgrade. In this step, the batch of IaaS resources to be upgraded in the current iteration is selected considering both the existing dependencies and the SLA constraints, and applied on the IaaS resources. The tasks for selecting the batch of IaaS resources are indicated from Tasks 14 to 21 in flow diagram 930 of FIG. 9C. Since VMs represent the service the IaaS cloud system provides, they are handled separately in step 4 by considering different criteria.

First, if applicable, the VMs are consolidated on the compute hosts as much as possible to free up some hosts. In particular, if VM supporting infrastructure resources need to be upgraded in an incompatible way, the disclosed method tries to evacuate the VMs from the physical hosts in common between the sets of $M_{Storage}$ and $M_{Compute}$, to accommodate as much as possible the PPU method. Note that during VM consolidation, the disclosed method respects the availability constraint, inferred from the anti-affinity grouping, by migrating only the allowed number (e.g. one) of VMs at a time from each anti-affinity group. After consolidation, the RG and the CG have to be updated accordingly.

To handle the dependencies during the upgrade, using the CG, the disclosed method identifies the resource groups that can be upgraded in the current iteration without violating any of their dependencies ($G_{batch}$). To do so in a systematic way, first $G_{batch}$ is initialized as the union of CG vertices with remaining changes (i.e. modification-type of "Upgrade", "Add", "Remove") and CG vertices with deactivated status (i.e. need to be activated).

Next, the disclosed method eliminates from $G_{batch}$ the vertices, which cannot be upgraded in the current iteration due to some dependencies. To do so a set of rules, referred to as elimination rules are defined. The elimination rules identify the non-suitable candidates in $G_{batch}$ based on the modification-type of the resources, the upgrade method associated with the upgrade unit of the first execution level in the actions-to-execute attribute of the resources, the characteristics of the dependencies of the resources (i.e. incompatibilityFactor and presence), the activation status of the resources, and the availability of additional resources required as prerequisite for the related upgrades.

These elimination rules guarantee: the enforcement of compatibility requirements of sponsorship dependencies between resources, the availability of services provided by peer resources, the satisfaction of the resource requirements of the PPU method, the availability of VM service according to the SLAs, the satisfaction of dependency compatibility requirements (i.e. before removing a resource from the system, and before adding a resource to the system).

One of the elimination rules is described herein. The elimination rule guarantees the satisfaction of the resource requirements of the PPU method used for upgrading a VM supporting infrastructure resource when it cannot be upgraded in place without impacting its services. As mentioned previously, additional resources may be required for maintaining in parallel both the old and the new configurations of the VM supporting infrastructure resource. If these cannot be provided using available resources, the administrator is asked to provide additional resources. Until these resource requirements are not satisfied, all the resources with changes related to the upgrade of the VM supporting infrastructure resource (indicated by the associated upgrade unit) are eliminated from $G_{batch}$.

In the example, the PPU method is used to upgrade the VM supporting virtual shared storage from VSAN to Ceph as the new and the old versions of the virtual shared storage are incompatible. To keep the continuity of the VM supporting service (e.g. VM live migration and failover) during the upgrade, the old configuration of the virtual shared storage (i.e. VSAN) has to remain operational until the new configuration (i.e Ceph) is ready for use. In addition, the compute hosts hosting the VMs need to be partitioned into those compute hosts compatible with the old version of the virtual shared storage (old partition) and those compute hosts compatible with the new version of the shared storage (new partition). To complete this upgrade, data conversion is also necessary, and it is performed as the VMs are migrated from the old partition to the new. Once all the VMs have been migrated as well as completing the related data migration, the old configuration of the virtual shared storage can be safely removed.

To guarantee the continuity of VM services during the upgrade of the shared storage, the minimum resource requirements need to be met for both the old and the new virtual shared storages with respect to their configurations and the data stored. For this reason, enough physical storage hosts are needed to keep the old configuration of the storage alive while bringing up the configuration of the new. The following expression evaluates whether the current system has enough storage hosts.

$$|M_{storage} - M_{usedCompute}| \geq \max(\text{MinHostReq Conf}_{oldStorage}, \text{MinHostReqCap}_{oldStorage}) + \max(\text{MinHostReqConf}_{newStorage}, \text{MinHostReqCap}_{newStorage}) \quad (1)$$

Please refer to Table I for the notation used.

$|M_{Storage} - M_{usedCompute}|$ represents the number of storage hosts that are not in use as compute hosts. This number should be equal to or greater than the minimum number of hosts required to support both the old and the new storage configurations during the upgrade. If (1) is satisfied, the resources with upgrade actions related to the undo unit associated with virtual storage upgrade remain in $G_{batch}$. Otherwise, applying the elimination rule will remove these resources from $G_{batch}$ as non-suitable candidates. Since the same check is performed in each subsequent iteration, whenever the additional number of storage hosts becomes available to fulfill this requirement, these resources will remain in the $G_{batch}$ as suitable candidates. Note that as the upgrade proceeds the number of available resources may change due to failures or scaling operations on compute hosts, but also if additional hosts are provided. Thus, in any iteration when (1) is not satisfied, this elimination rule will remove from $G_{batch}$ the resources related to this upgrade (i.e. their upgrade will be paused) until the required resources become available again.

After applying all elimination rules, the vertices remaining in the $G_{batch}$ represent the resource groups that can potentially be upgraded in this iteration (a.k.a. initial batch). However, this selection does not consider yet the dynamicity of the IaaS cloud; i.e. SLA violations may still occur if all these resource groups are upgraded in the current iteration. Namely, only a certain number of compute hosts can be taken out of service considering potential failovers and scale-out requests during the iteration. Thus, with these considerations a final batch of resource groups is selected from the initial batch.

The potential scale-out requests in each iteration are estimated based on the time required to upgrade the candidate batch in which the resources are upgraded in parallel. In each iteration, different resources may be upgraded, hence in each iteration the disclosed method considers the resources in the $G_{batch}$ and takes the maximum of their required time to upgrade ($T_i$). Using this the maximum scaling adjustment requests per tenant ($S_i$) during the upgrade of $G_{batch}$ in iteration i is calculated according to (2).

$$S_i = \max\left(s_n * \left\lceil \frac{T_i}{c_n} \right\rceil\right) \quad (2)$$

Where $s_n$ is the scaling adjustment per cooldown period $c_n$ of the $n^{th}$ tenant. Since tenants may have different scaling adjustment and cooldown time values, the disclosed method takes the maximum scaling adjustment among them as $S_i$ and by that it handles the worst case scenario. This calculation is valid for a single iteration only and it is recalculated for each iteration since in each iteration different resources may remain in the $G_{batch}$, and also tenants may be added and/or removed.

The maximum number of compute hosts that can be taken out of service (Z) in each iteration is calculated using (3).

$$Z_i = |M_{computeForOldVM} - M_{usedComputeForOldVM}| - \text{Scaling Resv}_{forOldVM} - \text{Failover Resv}_{forOldVM} \quad (3)$$

$|M_{ComputeForOldVM} - M_{usedComputeForOldVM}|$ is the number of compute hosts that are not in use and are eligible to provide compute services for tenants with VMs of the old version (i.e. compatible with the old configuration of VM supporting infrastructure resources or old hypervisor). FailoverResv$_{forOldVM}$ is the number of compute hosts reserved for failover for VMs of the old version. This number is equal to the number of host failures to be tolerated during an iteration (F), when there are VMs of the old version on hosts belonging to $M_{ComputeForOldVM}$ (i.e. $M_{usedComputeForOldVM}$ is not zero); otherwise F will be zero. F can be calculated based on the hosts' failure rate and a probability function. F estimates the required failover reservations for period $T_i$. ScalingResv$_{forOldVM}$ is the number of compute hosts for scaling reservation of tenants with VMs of the old version and it is calculated using (4).

$$\text{Scaling Resv}_{forOldVM} = S_i * \left\lceil \frac{A_i}{K} \right\rceil \quad (4)$$

$A_i$ indicates the number of tenants with VMs of the old version only and who have not reached their maxis, the maximum number of VMs, therefore may scale out on hosts compatible with the old version of the VMs.

Whenever $M_{usedComputeForOldVM}$, the set of compute hosts in use with the old version is empty, the maximum number of compute hosts that can be taken out of service in the iteration becomes equal to the set of hosts belonging to $M_{computeForOldVM}$.

Note that if there are no incompatibilities related to the upgrade of VM supporting infrastructure resources or hypervisors, the compute hosts of IaaS cloud system are not partitioned into old and new partitions. In this case the above calculations are applied to all compute hosts (as opposed to those hosting old VMs) and all VMs as there is no need to consider the compatibility of VMs and compute hosts.

Accordingly, the final batch of resource groups is selected from the initial batch $G_{batch}$ such that the total number of affected compute hosts is not more than $Z_i$. Any subset of $G_{batch}$ with a total of affected resources less or equal to $Z_i$ may be selected form the final batch $G_{batch}$. The upgrade coordinator selects such a final batch and generates the corresponding upgrade schedule. This upgrade schedule includes the upgrade actions of the first execution-level of the actions-to-execute attribute of each resource group in $G_{batch}$. The generated schedule is sent to the upgrade engine for execution. After execution, the upgrade engine sends back to the upgrade coordinator the results.

Note that applying some of the upgrade methods may require prerequisite and wrap-up actions. If a resource in the final batch belongs to an upgrade unit with such an associated upgrade method, the upgrade coordinator includes in the upgrade schedule the prerequisite actions before the upgrade actions of that resource and wrap-up actions after them. For example, as prerequisite actions for upgrading some physical hosts in an upgrade unit, the upgrade coordinator might need to include in the upgrade schedule before their upgrade actions to evacuate VMs from those physical hosts. As wrap-up actions it might need to include in the upgrade schedule the actions to bring the VMs back to the upgraded physical hosts.

If the upgrade actions of a resource in the final batch were executed successfully, the first execution-level is removed from its actions-to-execute attribute. The modification-type of the resource is adjusted according to the upgrade actions of the new first execution-level of the actions-to-execute attribute.

For a resource with a failed upgrade action, the counter of failed attempts is incremented, but the actions-to-execute attribute remains unchanged. As mentioned earlier, to bring the resource back to a stable configuration, a new upgrade schedule is created from the undo actions of the completed upgrade actions within the failed attempt to reverse their effect. This upgrade schedule is given to the upgrade engine right away for execution. If this operation fails as well, the resource is isolated and marked as failed.

Finally, the upgrade request model, the RG and the CG are updated according to the results of this step.

Step 4: Selecting the batch of VMs for migration. This step is only necessary when the compute hosts are separated into two incompatible partitions due to the upgrade of the VM supporting infrastructure and/or the hypervisors hosting VMs and therefore the VMs need to be migrated (and potentially upgraded) between them. For example, when the PPU method is used to handle the incompatibilities of the VM supporting infrastructure resource.

Figure 9D:
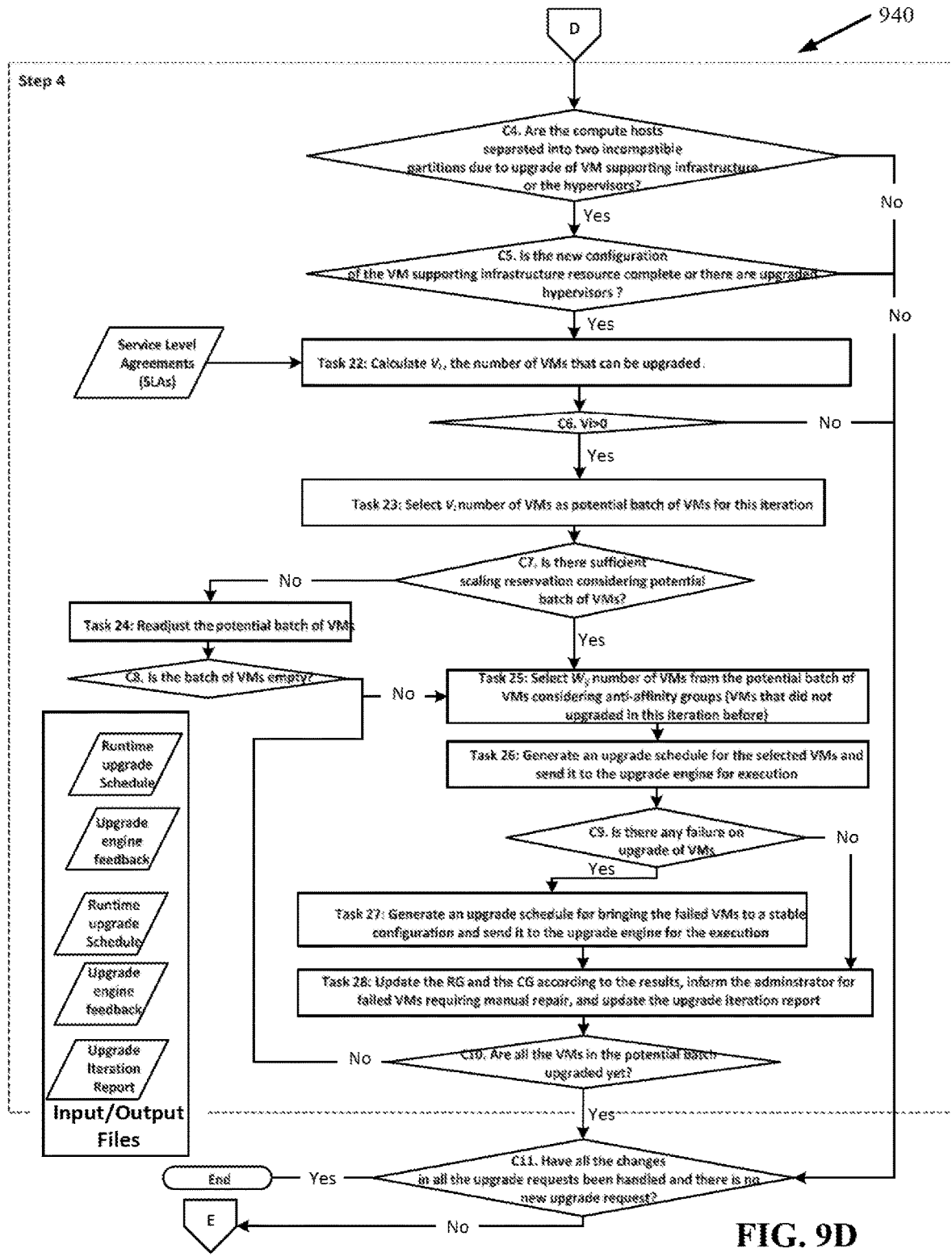

Before VMs of the old version can be upgraded and migrated to the hosts compatible with the new VM version, the new configuration of the VM supporting infrastructure resource has to be completed. If the new configuration is not ready the VM migration/upgrade is delayed to a subsequent iteration, when it is re-evaluated. In case of incompatibilities due to hypervisor upgrade, this step can be started after a successful upgrade of at least one hypervisor. The tasks for selecting the batch of VMs for migration/upgrade are indicated from Tasks 22 to 28 in flow diagram 940 of FIG. 9D.

The number of VMs ($V_i$) that can be migrated and if necessary upgraded in the current iteration i is calculated using equation (5).

$$V_i = (|M_{computeForNewVM} - M_{usedComputeForNewNM}| - \text{Scaling Resv}_{forNewVM} - \text{Failover Resv}_{forNewVM}) * K' \quad (5)$$

$M_{computeForNewVM}$ is the set of hosts that are eligible to provide compute services for tenants with VMs of the new version, $M_{usedComputeForNewVM}$ is the set of in-use hosts that are eligible to provide compute services for tenants with VMs of the new version, $\text{FailoverResev}_{forNewVM}$ is the number of hosts reserved for any failover for upgraded (new) VMs. $\text{FailoverResev}_{forNewVM}$ is calculated similarly to the failover reservation for tenants with VMs of the old version, i.e. F as mentioned in step 3, but for the period of time required for upgrading $V_i$ number of VMs. $\text{ScalingResv}_{forNewVM}$ is the number of hosts reserved for scaling for the tenants with upgraded (new) VMs, and K' is the new host capacity in terms of VMs after the upgrade. Here, $\text{ScalingResv}_{forNewVM}$ is calculated similarly to (4) for the tenants with VMs of the new version who have not reached their main (their maximum number of VMs). They may only scale out on hosts compatible with VMs of the new version. Note that a new scaling adjustment per tenant is calculated similar to (2), while considering the time required to migrate and if necessary upgrade $V_i$ number of VMs potentially through multiple sub-iterations as discussed below.

Considering the application level redundancy, typically only one VM per anti-affinity group can be migrated (and upgraded) at a time. Therefore, upgrading the $V_i$ VMs may be performed in several sub-iterations. Thus, the time required to migrate (and upgrade) $V_i$ number of VMs depends on the number of sub-iterations and the time required for a single VM. In each sub-iteration j, one VM is selected from each anti-affinity group with VMs of the old version. The batch of sub-iteration j will be $W_{ij}$. The anti-affinity groups and their VMs can be selected for the upgrade by different criteria. After the upgrade coordinator selects the VMs for the migration/upgrade, a schedule is created per sub-iteration and it is provided to the upgrade engine for execution. After the execution of each sub-iteration, the upgrade engine returns the results to the upgrade coordinator. The actions-to-execute attribute of VMs successfully migrated/upgraded is updated by removing the first execution level. For VMs with failed attempts, the failed attempts counter is incremented and a new schedule is generated to bring them back to a stable configuration. If this operation also fails for a VM it is isolated and marked as failed. The process repeats until all the $V_i$ VMs have been handled.

Whenever in step 3 the final batch of resources ($G_{batch}$) and in step 4 the batch of VMs ($V_i$) are both empty for an iteration, the upgrade process stops until there are enough resources available to continue (e.g. freed up through scaling in).

A novel method and system have been described for the upgrade of IaaS cloud systems under SLA constraints such as availability and elasticity. The disclosed method tackles in an integrated manner the challenges posed by dependencies and possible incompatibilities along dependencies, by upgrade failures, by the dynamicity of the IaaS cloud system, and by the amount of used extra resources.

In the disclosed method, an upgrade is initiated by an upgrade request which is composed of change sets requested for example by a system administrator indicating the desired changes in the IaaS cloud system. In addition to the initial change sets, the disclosed method allows for new upgrade requests at each iteration of the upgrade process. The upgrade actions required to upgrade each IaaS resource, the upgrade method appropriate for each subset of resources, and the batch of resources to upgrade in each iteration are determined by the method automatically and applied in an iterative manner. Since in each iteration, the batch of resources to upgrade is selected according to the current state of the system with respect to the dependencies and the SLA constraints, the interference between autoscaling and the upgrade process is mitigated. Furthermore, since the upgrade process is regulated based on the current state of the system, cloud providers can perform the upgrades gradually according to the state of the system, and they do not need to designate a maintenance window for performing the upgrades. In the disclosed method, in case of upgrade failures, localized retry and undo operations are also issued automatically according to the failures and undo/retry thresholds indicated by the administrator. This feature has the capability to undo a failed change set, while the upgrade proceeds with other change sets.

Figure 10:
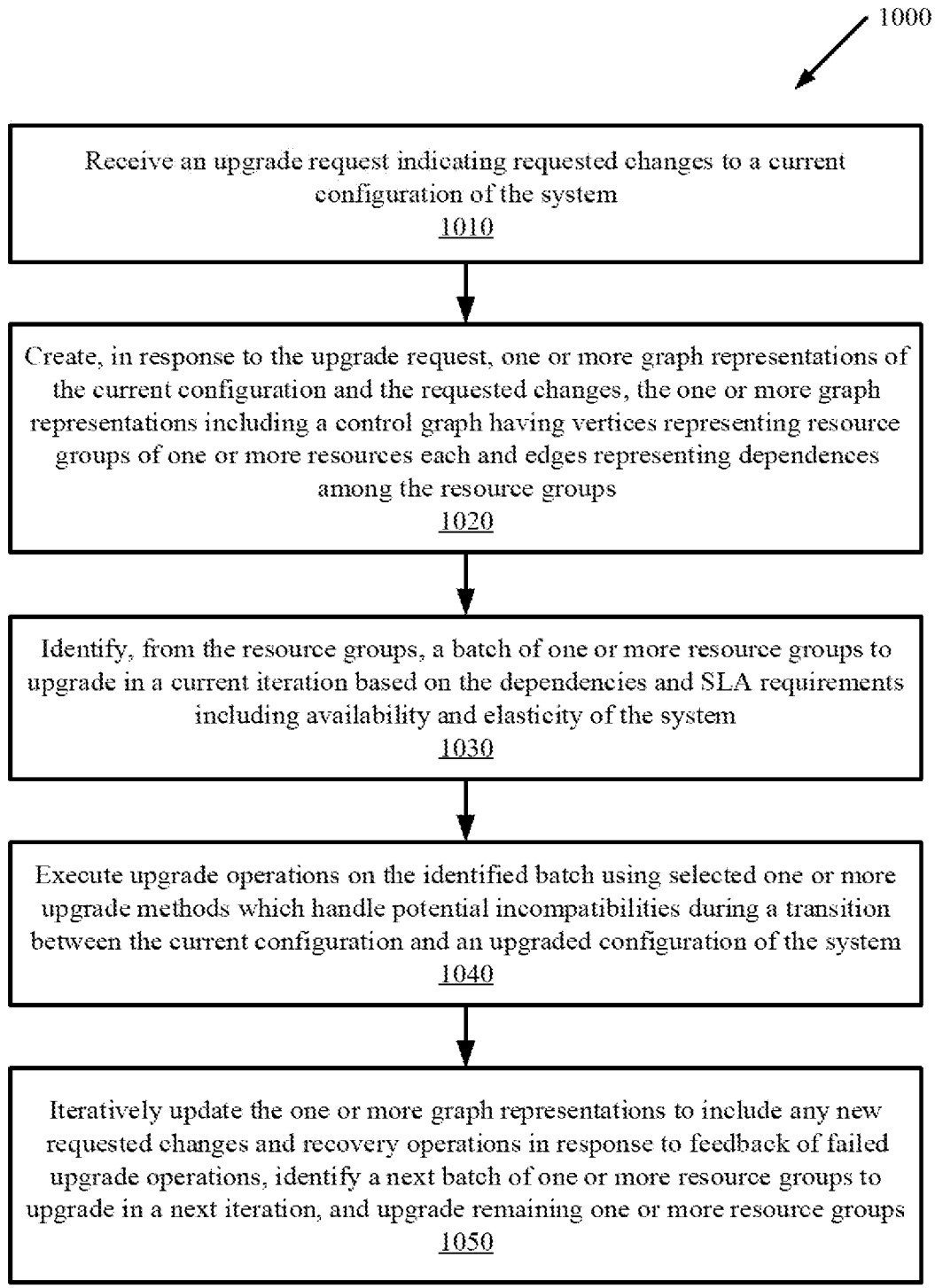
FIG. 10 is a flow diagram illustrating a method for upgrading resources in a system providing IaaS in an iterative process according to one embodiment.

FIG. 10 is a flow diagram illustrating a method 1000 for upgrading resources in a system providing IaaS in an iterative process. The method 1000 begins at step 1010 when the network node receives an upgrade request indicating requested changes to a current configuration of the system. In response to the upgrade request, the network node at step 1020 creates one or more graph representations of the current configuration and the requested changes. The one or more graph representations includes a control graph having vertices representing resource groups of one or more resources each and edges representing dependences among the resource groups. The network node at step 1030 identifies, from the resource groups, a batch of one or more resource groups to upgrade in a current iteration based on the dependencies and SLA requirements including availability and elasticity of the system. The network node at step 1040 executes upgrade operations on the identified batch using selected one or more upgrade methods which handle potential incompatibilities during a transition between the current configuration and an upgraded configuration of the system. The network node at step 1050 iteratively updates the one or more graph representations to include any new requested changes and recovery operations in response to feedback of failed upgrade operations, identifies a next batch of one or more resource groups to upgrade in a next iteration, and upgrades remaining one or more resource groups.

In one embodiment, the one or more graph representations includes a resource graph, which is a representation of the resources, the dependencies among the resources and the requested changes. The control graph is formed by contracting the resource graph based on the dependencies and upgrade methods to be performed.

In one embodiment, the upgrade request includes a collection of change sets independently applicable of one another, and each change set contains dependent changes. Each change set is checked for missing changes with respect to hardware or software dependencies according to descriptions of infrastructure component dependencies. If an infrastructure component dependency is not satisfied by the change set, a complementary change is added to the change set.

In one embodiment, a VM supporting subsystem includes one or more of: hypervisors, storage and controllers. In an iteration of the iterative process when the resources in the VM supporting subsystem are upgraded from an old version to a new version, a number of VMs are migrated from an old partition of compute hosts to a new partition incompatible with the old partition. The number of VMs to be migrated in the iteration is based on a number of compute hosts eligible for hosting the new version of the VMs and a number of compute hosts reserved for scaling and failover of the new version of the VMs during the iteration. In one embodiment, the VMs are migrated in multiple sub-iterations of the iteration according to an anti-affinity grouping requirement on the VMs. In one embodiment, a new configuration of the VM supporting subsystem is created, wherein the new configuration is composed of the resources of the new version hosted by the new partition of the compute hosts. The current configuration of the resources of the old version is maintained in parallel in the old partition of the compute hosts until all VMs compatible with the new version are migrated from the old partition to the new partition.

In one embodiment, the network node adds additional resources to the system only when existing resources in the system do not satisfy the SLA requirements during the upgrade operations.

In each iteration of the iterative process, the network node eliminates ineligible resources from the resources associated with remaining changes to obtain an initial batch of resources based on the dependencies in the system, a current status of the system, and ordering of the upgrade operations. Then a final batch of resources are selected from the initial batch. The remaining resources in the initial batch are not upgraded during the iteration to thereby handle potential scaling out requests and potential failures during the iteration.

The disclosed method is applicable to resources including a combination of compute resources, storage resources and network resources.

In one embodiment, the recovery operations performed in response to the feedback of failed upgrade operations include one or more of retry operations and undo operations. In one embodiment, the network node may apply a given change set on an undo unit of target resources corresponding to the given change set. If a change in the given change set cannot be successfully applied to a target resource in the undo unit, the network node reverts the effects of already-executed changes of the given change set on the undo unit.

In one embodiment, each change set is provided with a set of retry parameters which are used to determine whether a change from the change set can be successfully applied to a resource. The set of retry parameters includes one or more of: a max-retry threshold, which specifies a maximum number of re-try attempts for applying the change from the change set to the resource, and a max-completion-period, which specifies a maximum time allotted to complete all changes in the change set. Moreover, each change set is provided with a set of undo parameters including one or more of: an undo version, which specifies a version of a resource when reverting the effects of the change set on the resource, and an undo threshold, which indicates a required number of operational resources in the undo unit after applying a change in the change set to the undo unit. The network node may automatically re-apply the given change set on the undo unit in a next iteration when, in the current iteration, the change in the given change set cannot be successfully applied to the target resource in the undo unit.

Figure 11:
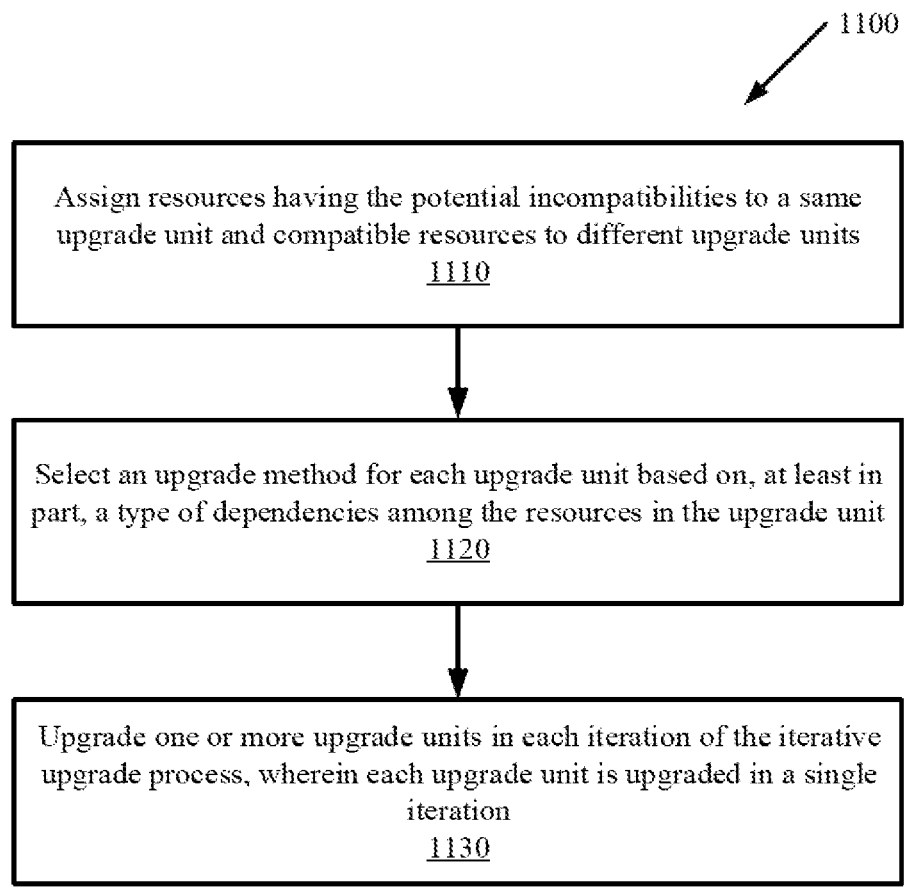
FIG. 11 is a flow diagram illustrating a method for selecting an upgrade method to handle potential incompatibilities of IaaS resources during an iterative upgrade process according to an embodiment.

FIG. 11 is a flow diagram illustrating a method 1100 for selecting an upgrade method to handle potential incompatibilities of resources during an iterative upgrade process according to an embodiment. The iterative upgrade process upgrades an IaaS-providing system from a current configuration to an upgraded configuration. The method 1100 begins at step 1110 when the network node assigns the resources having the potential incompatibilities to a same upgrade unit and compatible resources to different upgrade units; selecting an upgrade method for each upgrade unit based on, at least in part, a type of dependencies among the resources in the upgrade unit; and upgrading one or more upgrade units in each iteration of the iterative upgrade process, wherein each upgrade unit is upgraded in a single iteration.

In one embodiment, the upgrade method for each upgrade unit is selected based on a number of factors including one or more of: whether incompatibility exists among the resources, whether the potential incompatibility is among the resources having peer dependencies, sponsorship dependencies or communication dependencies, whether the communication dependencies are with remote link management, and whether there are more than two constituent resources participating in an aggregation dependency in the upgrade unit.

The upgrade method is one of: a split mode method, a first modified split mode method without remote link management, a second modified split mode method with remote link management, a third modified split mode with multiple constituent resources, a partial parallel universe method, and a rolling upgrade method.

In one embodiment, the split mode method divides the resources of an upgrade unit into two partitions including a first partition and a second partition which is upgraded after the first partition, and only one of the two partitions is active until the both of the two partitions are upgraded, the first modified split mode method and the second modified split mode method further divide the second partition into two or more partitions to keep communication dependent and sponsor resources in separate partitions, the first modified split mode method controls an order of deactivating and activating resources of incompatible versions, the second modified split mode method controls an order of deactivating and activating communication links between resources of incompatible versions, the third modified split mode method places each constituent resource in a separate partition, and the rolling upgrade method upgrades one or more upgrade units at a time while other upgrade units provide services of the system, each of the upgrade units containing a single resource. In the aforementioned upgrade method selection, the resources assigned to upgrade units exclude VMs in the system.

Figure 12:
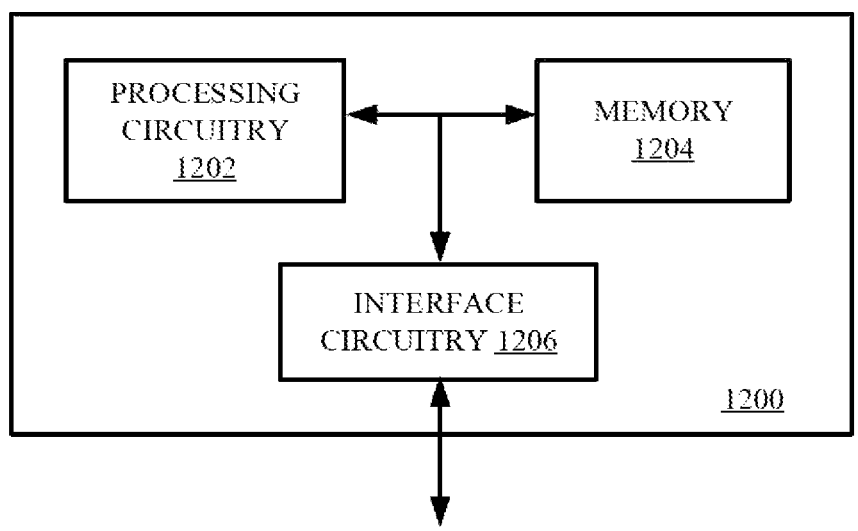
FIG. 12 is a block diagram of a network node according to one embodiment.

FIG. 12 is a block diagram illustrating a network node 1200 according to an embodiment. In one embodiment, the network node 1200 may be a server in an operator network or in a data center. The network node 1200 includes circuitry which further includes processing circuitry 1202, a memory 1204 or instruction repository and interface circuitry 1206. The interface circuitry 1206 can include at least one input port and at least one output port. The memory 1204 contains instructions executable by the processing circuitry 1202 whereby the network node 1200 is operable to perform the various embodiments described herein.

Figure 13:
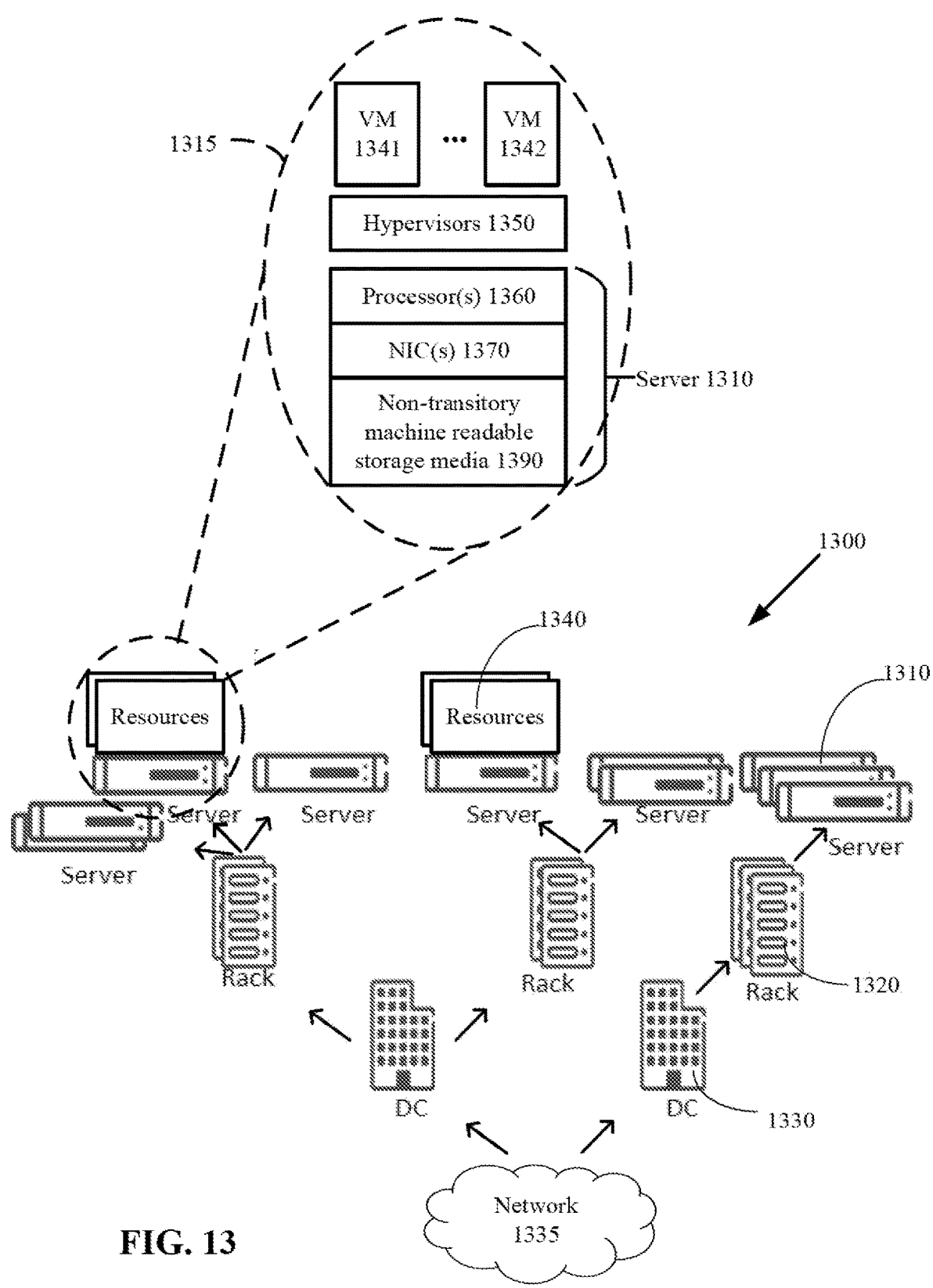
FIG. 13 is an architectural overview of a cloud computing environment according to one embodiment.

FIG. 13 is an architectural overview of a cloud computing environment 1300 that comprises a hierarchy of cloud computing entities. The cloud computing environment 1300 can include a number of different data centers (DCs) 1330 at different geographic sites connected over a network 1335. Each data center 1330 site comprises a number of racks 1320, each rack 1320 comprises a number of servers 1310. It is understood that in alternative embodiments a cloud computing environment may include any number of data centers, racks and servers. A set of the servers 1310 may be selected to host resources 1340. In one embodiment, the servers 1310 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to VMs, containers and their contained components share the same host OS instance and therefore create less overhead. Each of the servers 1310, the VMs, and the containers within the VMs may be configured to perform the various embodiments as have been described herein.

Further details of the server 1310 and its resources 1340 are shown within a dotted circle 1315 of FIG. 13, according to one embodiment. The cloud computing environment 1300 comprises a general-purpose network device (e.g. server 1310), which includes hardware comprising a set of one or more processor(s) 1360, which can be commercial off-the-shelf (COTS) processors, dedicated Application Specific Integrated Circuits (ASICs), or any other type of processing circuit including digital or analog hardware components or special purpose processors, and network interface controller(s) 1370 (NICs), also known as network interface cards, as well as non-transitory machine-readable storage media 1390 having stored therein software and/or instructions executable by the processor(s) 1360.

During operation, the processor(s) 1360 execute the software to instantiate a hypervisor 1350 and one or more VMs 1341, 1342 that are run by the hypervisor 1350. The hypervisor 1350 and VMs 1341, 1342 are virtual resources, which may run node instances in this embodiment. In one embodiment, the node instance may be implemented on one or more of the VMs 1341, 1342 that run on the hypervisor 1350 to perform the various embodiments as have been described herein. In one embodiment, the node instance may be instantiated as a network node performing the various embodiments as described herein.

Embodiments may be represented as a software product stored in a machine-readable medium (such as the non-transitory machine-readable storage media 1390, also referred to as a computer-readable medium, a processor-readable medium, or a computer usable medium having a computer readable program code embodied therein). The non-transitory machine-readable medium 1390 may be any suitable tangible medium including a magnetic, optical, or electrical storage medium including a diskette, compact disk read only memory (CD-ROM), digital versatile disc read-only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art.

What is claimed is:

1. A method for upgrading resources in a system providing Infrastructure-as-a-Service (IaaS) in an iterative process, comprising:
   receiving an upgrade request indicating requested changes to a current configuration of the system;
   creating, in response to the upgrade request, one or more graph representations of the current configuration and the requested changes, the one or more graph representations including a control graph having vertices representing resource groups of one or more resources each and edges representing dependencies among the resource groups;
   identifying, from the resource groups, a batch of one or more resource groups to upgrade in a current iteration based on the dependencies and Service Level Agreement (SLA) requirements including availability and elasticity of the system;
   executing upgrade operations on the identified batch using selected one or more upgrade methods which handle potential incompatibilities during a transition between the current configuration and an upgraded configuration of the system;
   iteratively updating the one or more graph representations to include any new requested changes and recovery operations in response to feedback of failed upgrade operations, identifying a next batch of one or more resource groups to upgrade in a next iteration, and upgrading remaining one or more resource groups;
   migrating, in an iteration of the iterative process when the resources in a VM supporting subsystem are upgraded from an old version to a new version, a number of VMs from an old partition of compute hosts to a new partition incompatible with the old partition, wherein the VM supporting subsystem includes one or more of hypervisors, storage and controllers;
   calculating the number of VMs to be migrated in the iteration based on a number of compute hosts eligible for hosting the new version of the VMs and a number of compute hosts reserved for scaling and failover of the new version of the VMs during the iteration;
   migrating the VMs in a plurality sub-iterations of the iteration according to an anti-affinity grouping requirement on the VMs;
   creating a new configuration of the VM supporting subsystem composed of the resources of the new version hosted by the new partition of the compute hosts; and
   maintaining in parallel the current configuration of the resources of the old version in the old partition of the compute hosts until all VMs compatible with the new version are migrated from the old partition to the new partition.

2. The method of claim 1, wherein creating the one or more graph representations further comprises:
creating, in response to the upgrade request, a resource graph as a representation of the resources, the dependencies among the resources and the requested changes; and
forming the control graph by contracting the resource graph based on the dependencies and upgrade methods to be performed.

3. The method of claim 1, wherein the upgrade request includes a collection of change sets independently applicable of one another and each change set contains dependent changes, the method comprises:
checking each change set for missing changes with respect to hardware or software dependencies according to descriptions of infrastructure component dependencies; and
adding a complementary change to the change set if an infrastructure component dependency is not satisfied by the change set.

4. The method of claim 1, further comprising:
adding additional resources to the system only when existing resources in the system do not satisfy the SLA requirements during the upgrade operations.

5. The method of claim 1, wherein, in each iteration of the iterative process, identifying the batch of one or more resource groups further comprises:
eliminating ineligible resources from the resources associated with remaining changes to obtain an initial batch of resources based on the dependencies in the system, a current status of the system, and ordering of the upgrade operations; and
selecting, from the initial batch, a final batch of resources as the identified batch, wherein remaining resources in the initial batch are not upgraded during the iteration to thereby handle potential scaling out requests and potential failures during the iteration.

6. The method of claim 1, wherein the resources include a combination of compute resources, storage resources and network resources and wherein the recovery operations include one or more of: retry operations and undo operations.

7. The method of claim 1, wherein the upgrade request includes a collection of change sets independently applicable of one another and each change set contains dependent changes, the method comprises:
applying a given change set on an undo unit of target resources corresponding to the given change set; and
if a change in the given change set cannot be successfully applied to a target resource in the undo unit, reverting effects of already-executed changes of the given change set on the undo unit.

8. The method of claim 7, wherein each change set is provided with a set of retry parameters which are used to determine whether a change from the change set can be successfully applied to a resource, the set of retry parameters including one or more of:
a max-retry threshold, which specifies a maximum number of re-try attempts for applying the change from the change set to the resource, and
a max-completion-period, which specifies a maximum time allotted to complete all changes in the change set.

9. The method of claim 7, wherein each change set is provided with a set of undo parameters including one or more of:
an undo version, which specifies a version of a resource when reverting the effects of the change set on the resource, and
an undo threshold, which indicates a required number of operational resources in the undo unit after applying a change in the change set to the undo unit.

10. The method of claim 7, further comprising:
automatically re-applying the given change set on the undo unit in a next iteration when, in the current iteration, the change in the given change set cannot be successfully applied to the target resource in the undo unit.

11. A network node, comprising:
processing circuitry; and memory, which stores instructions executable by the processing circuitry to upgrade resources in a system providing Infrastructure-as-a-Service (IaaS) in an iterative process, the network node operative to:
receive an upgrade request indicating requested changes to a current configuration of the system;
create, in response to the upgrade request, one or more graph representations of the current configuration and the requested changes, the one or more graph representations including a control graph having vertices representing resource groups of one or more resources each and edges representing dependencies among the resource groups;
identify, from the resource groups, a batch of one or more resource groups to upgrade in a current iteration based on the dependencies and Service Level Agreement (SLA) requirements including availability and elasticity of the system;
execute upgrade operations on the identified batch using selected one or more upgrade methods which handle potential incompatibilities during a transition between the current configuration and an upgraded configuration of the system;
iteratively update the one or more graph representations to include any new requested changes and recovery operations in response to feedback of failed upgrade operations, identify a next batch of one or more resource groups to upgrade in a next iteration, and upgrade remaining one or more resource groups;
migrating, in an iteration of the iterative process when the resources in a VM supporting subsystem are upgraded from an old version to a new version, a number of VMs from an old partition of compute hosts to a new partition incompatible with the old partition, wherein the VM supporting subsystem includes one or more of hypervisors, storage and controllers;
calculating the number of VMs to be migrated in the iteration based on a number of compute hosts eligible for hosting the new version of the VMs and a number of compute hosts reserved for scaling and failover of the new version of the VMs during the iteration;
migrating the VMs in a plurality sub-iterations of the iteration according to an anti-affinity grouping requirement on the VMs;
creating a new configuration of the VM supporting subsystem composed of the resources of the new version hosted by the new partition of the compute hosts; and
maintaining in parallel the current configuration of the resources of the old version in the old partition of the compute hosts until all VMs compatible with the new version are migrated from the old partition to the new partition.

12. The network node of claim 11, wherein creating the one or more graph representations further comprises:
creating, in response to the upgrade request, a resource graph as a representation of the resources, the dependencies among the resources and the requested changes; and
forming the control graph by contracting the resource graph based on the dependencies and upgrade methods to be performed.

13. The network node of claim 11, wherein the upgrade request includes a collection of change sets independently applicable of one another and each change set contains dependent changes, further comprises:
checking each change set for missing changes with respect to hardware or software dependencies according to descriptions of infrastructure component dependencies; and
adding a complementary change to the change set if an infrastructure component dependency is not satisfied by the change set.

14. The network node of claim 11, further comprising:
adding additional resources to the system only when existing resources in the system do not satisfy the SLA requirements during the upgrade operations.

15. The network node of claim 11, wherein, in each iteration of the iterative process, identifying the batch of one or more resource groups further comprises:
eliminating ineligible resources from the resources associated with remaining changes to obtain an initial batch of resources based on the dependencies in the system, a current status of the system, and ordering of the upgrade operations; and
selecting, from the initial batch, a final batch of resources as the identified batch, wherein remaining resources in the initial batch are not upgraded during the iteration to thereby handle potential scaling out requests and potential failures during the iteration.

16. The network node of claim 11, wherein the resources include a combination of compute resources, storage resources and network resources and wherein the recovery operations include one or more of: retry operations and undo operations.

17. The network node of claim 11, wherein the upgrade request includes a collection of change sets independently applicable of one another and each change set contains dependent changes, further comprises:
applying a given change set on an undo unit of target resources corresponding to the given change set; and
if a change in the given change set cannot be successfully applied to a target resource in the undo unit, reverting effects of already-executed changes of the given change set on the undo unit.

18. The network node of claim 17, wherein each change set is provided with a set of retry parameters which are used to determine whether a change from the change set can be successfully applied to a resource, the set of retry parameters including one or more of:
a max-retry threshold, which specifies a maximum number of re-try attempts for applying the change from the change set to the resource, and
a max-completion-period, which specifies a maximum time allotted to complete all changes in the change set.

19. The network node of claim 17, wherein each change set is provided with a set of undo parameters including one or more of:
an undo version, which specifies a version of a resource when reverting the effects of the change set on the resource, and
an undo threshold, which indicates a required number of operational resources in the undo unit after applying a change in the change set to the undo unit.

20. The network node of claim 17, further comprising:
automatically re-applying the given change set on the undo unit in a next iteration when, in the current iteration, the change in the given change set cannot be successfully applied to the target resource in the undo unit.

* * * * *